(12) United States Patent
Hovden et al.

(10) Patent No.: US 10,540,054 B2
(45) Date of Patent: Jan. 21, 2020

(54) NAVIGATION POINT SELECTION FOR NAVIGATING THROUGH VIRTUAL ENVIRONMENTS

(71) Applicant: Matterport, Inc., Sunnvyvale, CA (US)

(72) Inventors: Gunnar Hovden, Los Gatos, CA (US); David V. Buchhofer, Jr., Blackwood, NJ (US); Matthew Bell, Palo Alto, CA (US)

(73) Assignee: Matterport, Inc., Sunnyvale, CA (US)

( * ) Notice: Subject to any disclaimer, the term of this patent is extended or adjusted under 35 U.S.C. 154(b) by 85 days.

(21) Appl. No.: 15/710,686

(22) Filed: Sep. 20, 2017

(65) Prior Publication Data
US 2019/0087067 A1  Mar. 21, 2019

(51) Int. Cl.
*G06F 3/0481* (2013.01)
*G06T 19/00* (2011.01)
*G06F 16/954* (2019.01)
*G06T 19/20* (2011.01)
*G06F 17/00* (2019.01)

(52) U.S. Cl.
CPC ........ *G06F 3/04815* (2013.01); *G06F 16/954* (2019.01); *G06T 19/003* (2013.01); *G06T 19/20* (2013.01)

(58) Field of Classification Search
CPC ............... G06F 3/04815; G06F 16/945; G06F 17/30873; G06T 19/003; G06T 19/03; G06T 19/20
See application file for complete search history.

(56) References Cited

U.S. PATENT DOCUMENTS

| 10,139,985 B2 * | 11/2018 | Mildrew ................. G06F 3/011 |
| 2006/0171586 A1 | 8/2006 | Georgescu et al. |
| 2007/0198178 A1 * | 8/2007 | Trimby .................. G06N 5/003 701/533 |
| 2008/0112610 A1 | 5/2008 | Israelsen et al. |
| 2012/0041722 A1 | 2/2012 | Quan et al. |

(Continued)

OTHER PUBLICATIONS

Lecture21, "Covering Codes and Lossy Data Compression", Apr. 19, 2017, retrieved from https://people.cs.unnass.edu/~arya/courses/690T/lecture21.pdf on Febuary 1, 2019 (Year: 2017).*

*Primary Examiner* — Quoc A Tran
(74) *Attorney, Agent, or Firm* — Ahmann Kloke LLP

(57) ABSTRACT

Techniques are disclosed for automated selection of navigation points for navigating through a computer-generated virtual environment such as, for example, a virtual reality (VR) environment. Specifically, an input set of connected navigation points in a virtual environment is automatically pruned to a connected subset thereof, according to one or more selection factors where at least one of the selection factors is whether the subset will continue to be "connected" after pruning a navigation point from the input set. In addition to whether the pruning of a navigation point will allow the remaining navigation points to remain connected, techniques for pruning based on one or more additional selection factors are also disclosed. According to one additional selection factor, navigation point pruning is based on the degree to which coverage of an input set of navigation points would be reduced by pruning any given navigation point from the input set.

19 Claims, 19 Drawing Sheets
(10 of 19 Drawing Sheet(s) Filed in Color)

(56) References Cited

U.S. PATENT DOCUMENTS

2012/0127169 A1* 5/2012 Barcay .................... G06T 15/20
345/419
2014/0043436 A1 2/2014 Bell et al.

* cited by examiner

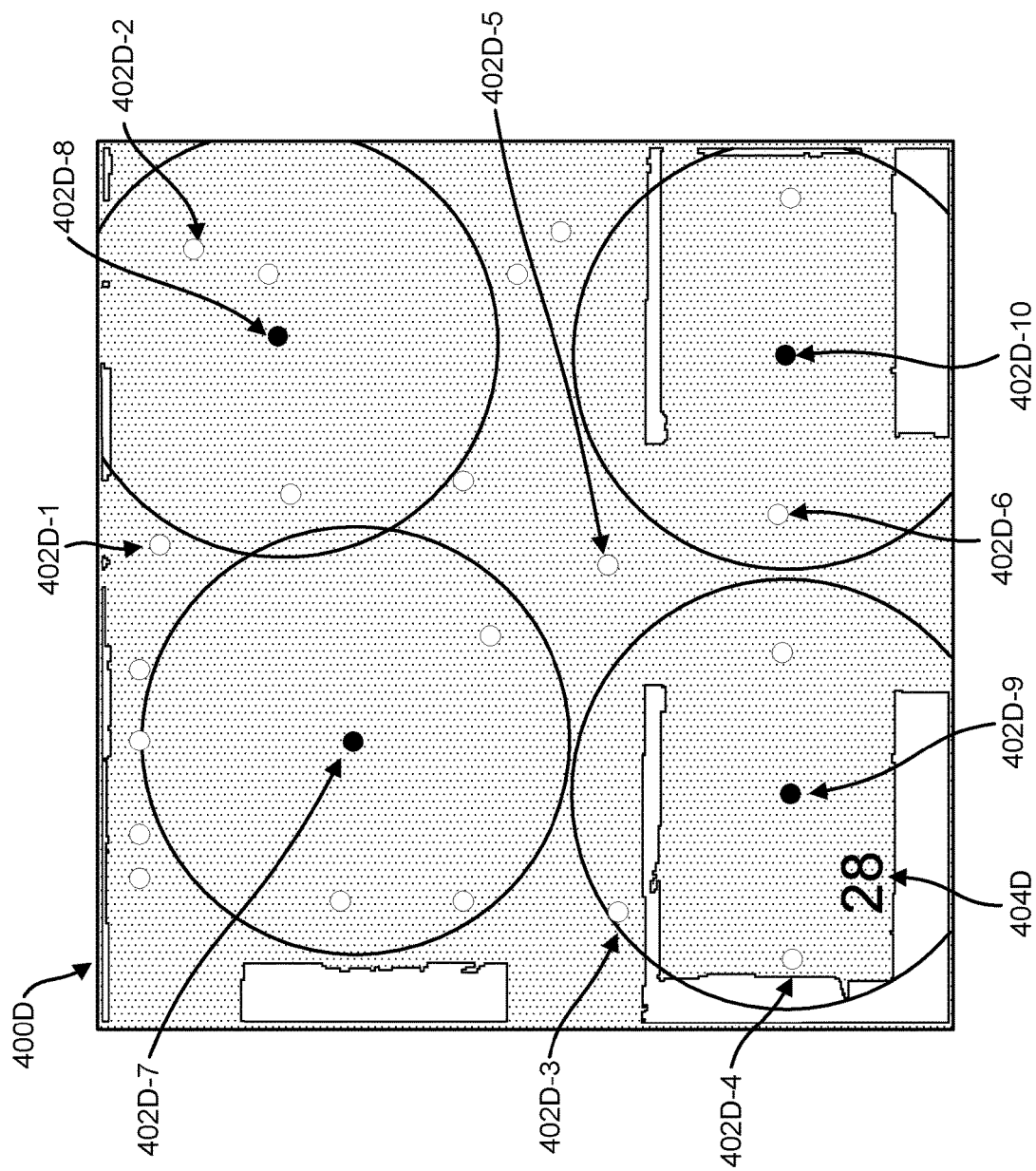

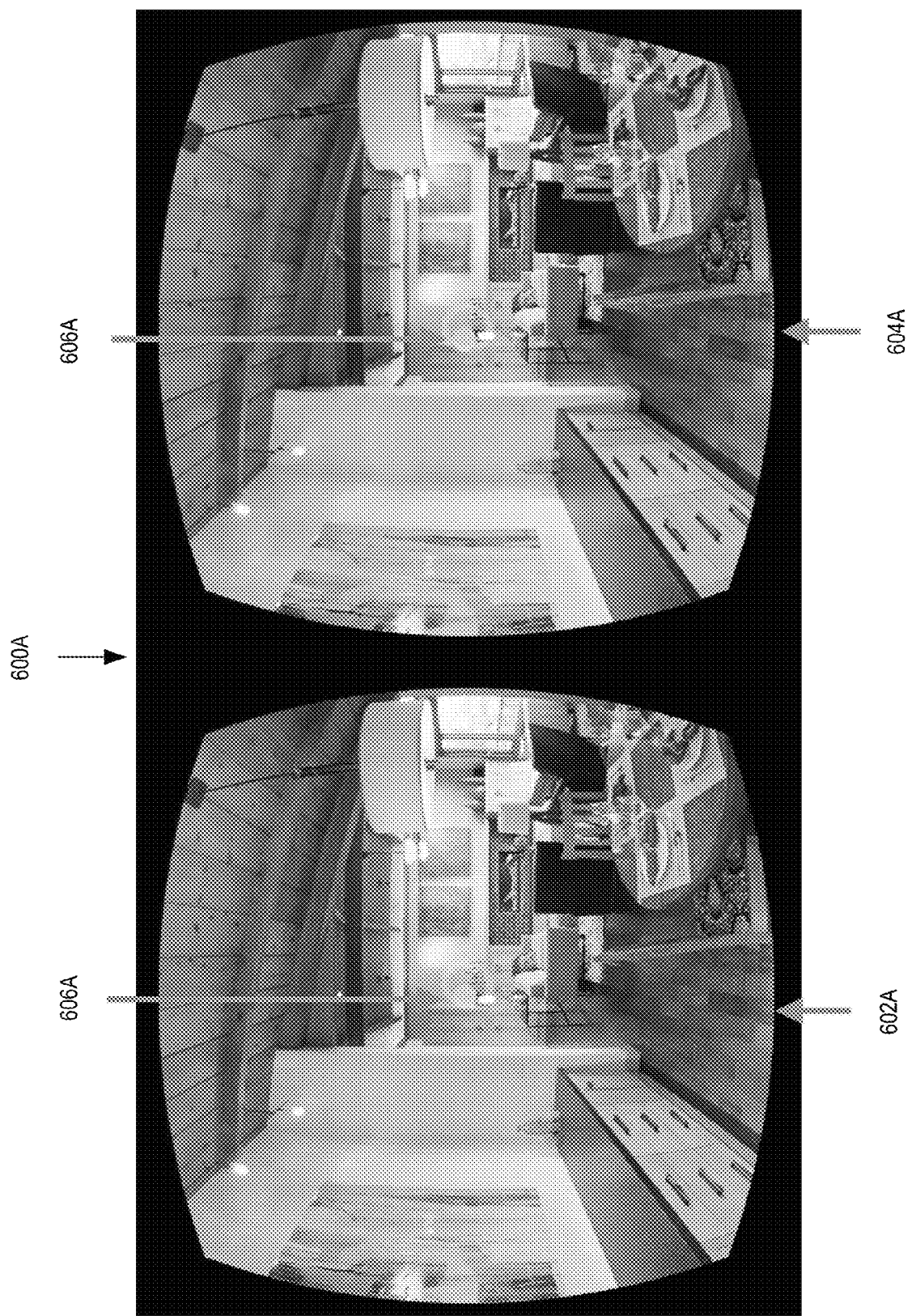

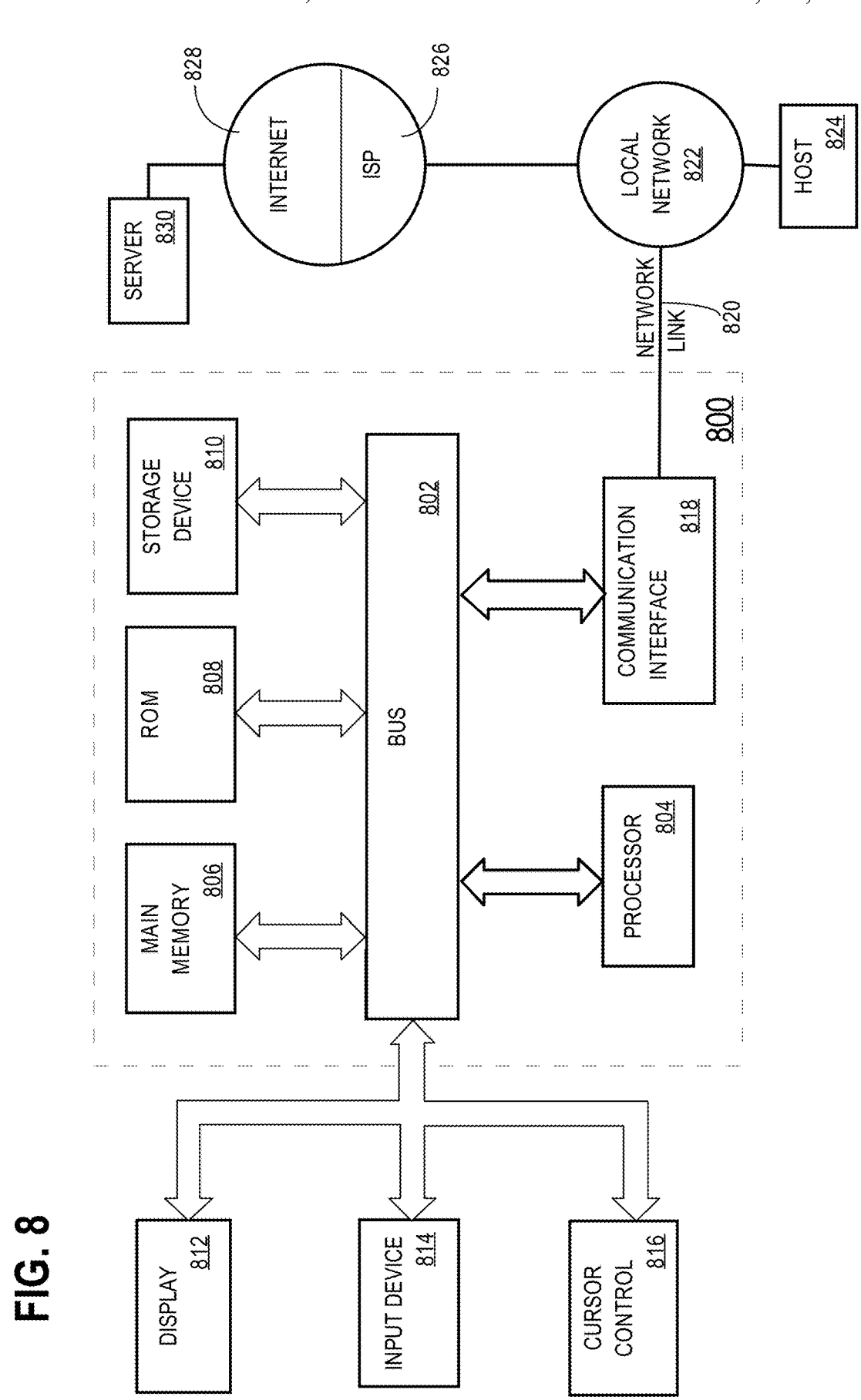

NAVIGATION POINT SELECTION FOR NAVIGATING THROUGH VIRTUAL ENVIRONMENTS

FIELD OF THE INVENTION

The present invention relates to techniques for navigating through a computer-generated virtual environment such as, for example, a virtual reality (VR) environment and, more specifically, to automated navigation point selection for navigating through such environments.

BACKGROUND

Systems exist whereby users can navigate through a computer-generated virtual environment such as, for example, a Virtual Reality (VR) environment, by repeatedly selecting predefined navigation points which correspond to a fixed set of viewing positions within the environment. In response to selecting a navigation point, the user's virtual position within the environment transitions to the selected navigation point, thereby allowing the user to view the environment from the viewing position that corresponds to the navigation point. The transition may be gradual (showing objects move past as the user "moves" through the environment), or instantaneous. The manner by which navigation points are selected by the user may vary based on a variety of factors, including the hardware being used to display the virtual environment.

For example, when viewing a virtual environment using a conventional computer, the navigation may involve manipulation of a cursor control device, such as a mouse or trackpad, and/or pressing keys of a keyboard. On the other hand, while wearing a VR headset, navigation may involve directing gaze, head movement, or a hand controller in a particular direction and then performing a navigation-triggering action. The navigation-triggering action may be operation of a control on the headset, on a handheld device that is engaged in wired or wireless communication with the headset, via a hand gesture, or merely by maintaining the gaze on a "navigation-point-marker" for more than a threshold period of time.

Navigation-point-markers are visual indicators, displayed within a virtual environment, of navigation points. Navigation-point-markers may take a variety of forms. For example, navigation point markers may simply appear as circles, spheres, or other shapes (e.g., a flag) floating in space within the virtual environment. Preferably, the navigation-point-markers are large enough to be detectable by a user that is navigating the virtual environment, but small enough so as not to obscure too much of the virtual environment or otherwise diminish the user's interactive virtual experience.

Techniques have been developed to create three-dimensional ("3D") models based on photo images (and possibly 3D data) captured from a real-world environment. Such techniques are described, for example, in:

U.S. patent application Ser. No. 13/539,252 entitled "Capturing and aligning multiple 3-dimensional scenes"

U.S. patent application Ser. No. 13/776,688 entitled "Capturing and aligning three-dimensional scenes" Each of these documents is incorporated herein, in its entirety, by this reference.

Once created, the 3D models may be navigated using navigation points in the manner described above. Under these circumstances, the navigation points will typically correspond to the image-capture positions that were used in the real-world environment to obtain the photo images upon which the 3D model is based. With some techniques, the images captured at the image-capture positions are panoramic, allowing the user to "look around" in the virtual environment in all directions.

For example, for a VR environment of a kitchen viewed by a user wearing a VR headset, the user may be able to see the kitchen sink when the user's head is in a neutral position, see the kitchen stove when the user turns her head to the right, and see the kitchen floor when the user tilts her head downward. In this example, the photo images of the kitchen sink, stove, and floor that the user sees can be captured at an image-capture position in the kitchen as part of a panoramic photo image capture process.

Unfortunately, some of the image-capture positions are likely to translate into undesirable navigation points. For example, some of the image-capture positions may be very close to walls or other large objects. Few people would intentionally navigate to such positions within the virtual environment, because few people would find those positions to be comfortable viewing positions, especially in VR environments where users can more easily become physically disoriented.

Proximity to a wall or other large object is merely one reason why some image-capture positions are not well-suited to be navigation points. Other examples of image-capture positions that are not well-suited to be navigation points include image-capture positions associated with low-quality photos, image-capture positions whose photo images do not capture anything particularly interesting, image-capture positions captured at unusually high or low heights, and image-capture positions whose photo images are largely redundant with the photo images of nearby image-capture positions.

Another problem with using every image-capture position as a navigation point is that, the denser the image-capture positions, the denser the navigation-point markers will be within the virtual environment. The greater the number of navigation-point markers, the greater the likelihood that seeing those markers will impair the user's virtual experience. For example, when viewing a bedroom in a virtual environment, a user will likely be annoyed or confused if fifty floating circles are displayed as navigation-point markers within the bedroom. In addition, densely packed navigation-points may require an unacceptably large number of navigation operations for a user to travel between points within the virtual environment.

To improve the virtual navigation experience, it is possible for users to manually designate which image-capture positions are to be used as navigation points in a virtual environment. However, when a large real-world environment is being modelled, a very large number of image-capture positions may be used to capture the photo images to create the model. As the size of the modeled environment and number of image-capture positions increase, so does the difficulty of manually selecting the optimal set of image-capture positions to be used as navigation points.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings:

FIGS. 4A-4E illustrate the example process for selecting a threshold coverage subset of navigation points with respect to the example virtual environment.

FIGS. 6A-6E show navigating through an example virtual reality (VR) environment using navigation-point markers.

FIG. 8 is a block diagram that illustrates a computer system upon which an embodiment of the invention may be implemented.

DETAILED DESCRIPTION

Figure 1:
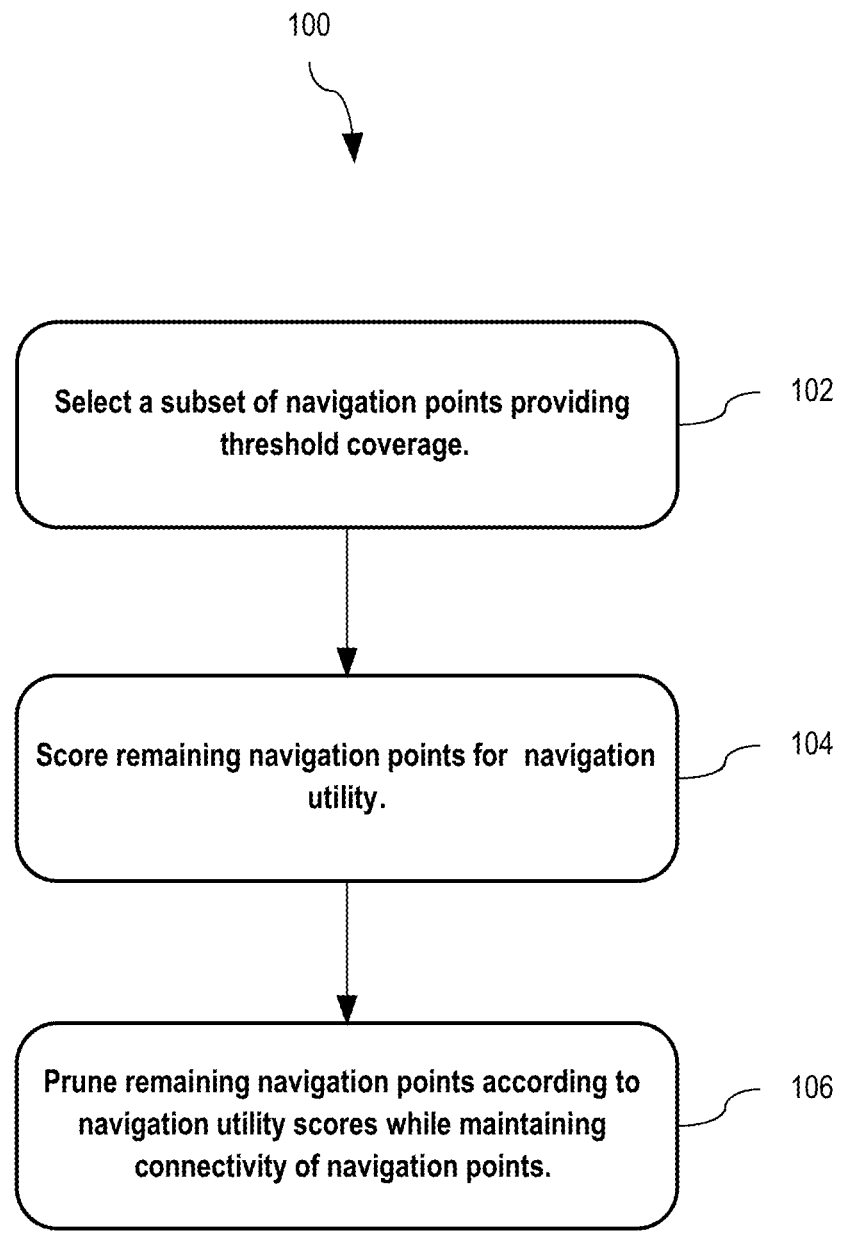
FIG. 1 is a flowchart of an example process of automated navigation point selection for navigating through virtual environments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for automated selection of navigation points for navigating through a computer-generated virtual environment such as, for example, a virtual reality (VR) environment. Specifically, an input set of connected navigation-points in a virtual environment is automatically pruned to a connected subset thereof, according to one or more selection factors where at least one of the selection factors is whether the subset will continue to be "connected" after pruning a navigation point from the input set.

Connected Navigation Points

According to some embodiments of the present invention, for a set of navigation points to be "connected" there must at least exist a navigation path between every pair of navigation points in the set such that there are no unreachable navigation points in the set. A set of navigation points that is not connected is "disconnected.".

Relatedly, two navigation points, in addition to being connected, are "adjacent" if there is at least unidirectional "line-of-sight navigation" between them. A first navigation point has line-of-sight navigation to a second navigation point if a navigation-point marker for the second navigation point is viewable in the virtual environment at the viewing position corresponding to the first navigation point and the user can navigate in the virtual environment (with appropriate user input) directly from the first navigation point to the second navigation point.

For example, consider a simple virtual environment of the interior of a dwelling, such as a house, where the virtual environment has only three navigation points:

a first navigation point corresponding to a location in the kitchen, a second navigation point corresponding a location in the hallway connecting the kitchen to the dining room, and a third navigation point corresponding to a location in the dining room.

Assume further that the navigation point in the kitchen is adjacent to the navigation point in the hallway, and the navigation point in the hallway is adjacent to the navigation point in the dining room. However, because of an obstruction (e.g., a wall) between the kitchen and the dining room, the navigation points in the kitchen and the dining room are not adjacent. Because of the obstruction, pruning the navigation point in the hallway would cause the remaining navigation points in the kitchen and the dining room to no longer be connected because the navigation points in the kitchen and the dining room are not adjacent and because the user can no longer navigate by line-of-sight from one to the other through a series of adjacent navigation points. Techniques described herein automatically prune the input set of connected navigation points to a connected subset thereof.

After an input set of connected navigation points is pruned to a connected subset thereof, the virtual environment may then be presented to the user with navigation-point markers only for the subset of connected navigation points. By doing so, the virtual environment appears to the user to be less cluttered with navigation-point markers than the virtual environment would appear if presented with navigation-point markers for all the input navigation points. While techniques described herein are not limited to VR environments, the techniques may be especially useful for such environments where, because of the level of sensory immersion, excessive visual clutter can more easily cause the user to become disoriented or uncomfortable than where the virtual environment is presented using a conventional computer. In addition, computing resources (e.g., processor and storage resources) are conserved because there are fewer navigation-point views to render.

In addition to taking into account whether the pruning of a navigation point will allow the remaining navigation points to remain connected, techniques described herein select a navigation point for pruning based on one or more additional selection factors. According to one embodiment, navigation point pruning is also based on the degree to which coverage of an input set of navigation points would be reduced by pruning any given navigation point from the input set.

For example, if two navigation points partially overlap in coverage because they are located near each other in the virtual environment, then the one of the two navigation points whose pruning would reduce total coverage of the input set by the least amount may be pruned from the input set. The term "coverage," including different types of coverage, is defined in greater detail elsewhere in this document. In general, however, coverage refers to portions of the virtual environment that can be viewed by a user when navigating the virtual environment using a set of navigation points. According to techniques described herein, the selected subset of connected navigation points provides at least a threshold amount of coverage of the virtual environment such that the user's ability to navigate through the virtual environment is not substantially reduced due to the pruning.

Other selection factors are possible. For example, a virtual environment may be based on a 3D model where the 3D model is constructed based on photo images of a real-world environment and where the input set of navigation-points corresponds to image-capture positions in the real-world environment at which the photo images were captured. According to another additional selection factor, a navigation point in the input set is selected as a candidate for pruning based on the quality of the photo image(s) captured at the image-capture position corresponding to the navigation point. For example, the navigation point may be pruned from the input set if the quality of the captured photo image(s) is/are poor and the remaining input navigation points will continue to be connected after pruning the navigation point.

Navigable but Disconnected Navigation Points

As mentioned, for a set of navigation points to be connected according to some embodiments of the present invention, there must exist a navigation path between every pair of navigation points in the set. For purposes of explanation, a set of navigation points for which there exists a navigation path between every pair of navigation points is referred to herein as a "navigable" set of navigation points. In some embodiments, a navigable set of navigation points is not considered to be connected if the shortest navigation path between a pair of navigation points in the navigable set is too long. In this case, if pruning a navigation point that is a candidate for pruning will render the remaining set of navigation points navigable, but not connected, then the candidate navigation point may not be pruned from the input set of navigation points.

A navigation path between two navigation points may be considered too long according to a variety of different criteria. For example, a navigation path between two navigation points A and B may be too long if the number of intermediate navigation points on the navigation path is greater than a threshold (e.g., more than two intermediate navigation points or other suitable threshold amount). As another example, a candidate navigation point may not be pruned from the input set if it would result in the length of the shortest navigation path between two navigation points in the set of remaining navigation points increasing by at least a threshold amount. For example, a candidate navigation point A may not be pruned from the input set if it would result in the length of the shortest navigation path between navigation points B and C in the remaining navigation points increasing by 70% or more, or another suitable threshold amount. Here, length may be measured as distance in the virtual environment between navigation points. A combination of criteria may also be used. For example, a candidate navigation point A may not be pruned if it would result in either:

the number of intermediate navigation points on the shortest path between navigation points B and C being two or more; or the length of the shortest path between navigation points B and C increasing by 70% or more.

Thus, a set of navigation points can be navigable but still considered disconnected. By doing so, selection of a less useful set of navigation points is avoided.

Terminology

Before continuing the discussion of embodiments of the present invention, it may be useful to define some terminology used in this description and in the appended claims.

The "coverage" of a set of navigation points refers to all portions of the virtual environment that can be viewed by a user when navigating the virtual environment using the set of navigation points. A "virtual environment" refers to a 3D model reconstructed from captured data. The "coverage" of an individual navigation point refers generally to the portion of the virtual environment that is visible from that navigation point. The "exclusive coverage" of an individual navigation point is the portion of the virtual environment that is visible from that navigation point, but not from any other navigation point in the input set. The degree to which coverage of an input set of navigation points would be reduced by pruning a given navigation point generally correlates with the exclusive coverage of the navigation point.

As used herein, "being above a threshold" means that a value for an item under comparison is above a specified other value, that an item under comparison is among a certain specified number of items with the largest value, or that an item under comparison has a value within a specified top percentage amount. As used herein, "being below a threshold" means that a value for an item under comparison is below a specified other amount, that an item under comparison is among a certain specified number of items with the smallest value, or that an item under comparison has a value within a specified bottom percentage amount. As used herein, "being within a threshold" means that a value for an item under comparison is between two specified other values, that an item under comparison is among a middle-specified number of items, or that an item under comparison has a value within a middle-specified percentage range. Relative terms, such as "high" or "unimportant", when not otherwise defined, can be understood as assigning a value and determining how that value compares to an established threshold. For example, the phrase "provided at least a threshold amount of coverage" can be understood to mean coverage that is equal to or above a threshold.

Constructing a 3D Model of a Real-World Environment

Before an input set of connected navigation points may be pruned based on one or more selection factors, the input set must first be obtained. The input set may be obtained from a variety of different sources. One possible source is a computer-generated 3D model of a real-world environment that is constructed based on a collection of photo images of the real-world environment where each navigation point in the input set corresponds to an image-capture position in the real-world environment. Various techniques may be used to generate a 3D model based on a collection of photo images.

According to another technique, three-dimensional capture device data from different locations is received allowing for different perspectives of 3D scenes. An algorithm uses the capture device data to determine potential alignments between different 3D scenes via coordinate transformations. Potential alignments are evaluated for quality and subsequently aligned subject to the existence of sufficiently high relative or absolute quality. A global alignment of all or most of the input 3D scenes into a single coordinate frame may be achieved. The presentation of areas around a particular hole or holes takes place allowing the user to capture the requisite 3D scene containing areas within the hole or holes as well as part of the surrounding area using, for example, the 3D capture device. The new 3D captured scene is aligned with existing 3D scenes and/or 3D composite scenes. The technique is described in greater detail in U.S. patent application Ser. No. 13/539,252 entitled "Capturing and aligning multiple 3-dimensional scenes"

According to another technique, a 3D capture device captures 3D images of a real-world environment at different capture positions relative to a 3D coordinate space. The 3D capture device sends the 3D images, or 3D information derived therefrom, to a mobile device as the 3D images are captured, or as the 3D information is derived. The mobile device iteratively aligns the 3D images, or the derived information, based on spatial distance information for the real-world environment captured by the 3D capture device, to generate a 3D model of the real-world environment as the mobile device receives the 3D images, or the derived information, from the 3D capture device. The mobile device can render the 3D model on a display screen of the device. This technique is described in greater detail in U.S. patent application Ser. No. 13/776,688 entitled "Capturing and aligning three-dimensional scenes," the entire contents of which is hereby incorporated by reference.

Frequently, the photo images used to construct 3D models of real-world environments are panoramic and include or are associated with various types of metadata used in the construction of the 3D models, some of which may be tied to specific sets of coordinates. For example, each photo image typically includes or is associated with spatial information that indicates exactly where the photo image was captured, the focal direction for the photo image (or for each portion of the photo image when the photo image is panoramic), etc. In addition, the metadata may include depth information, indicating the distance of captured objects from the spatial point from which the photo image was captured.

The techniques described herein for pruning connected navigation points obtained from 3D models of real-world environments are not limited to any particular technique for constructing those 3D models, as long as navigation points can be determined based on the models.

Furthermore, while a virtual environment may be based on a 3D model that is constructed based on photo-images captured from real-world locations, it is not a requirement of the present invention that navigation points in the virtual environment correspond to real-world locations. For example, the virtual environment may be a gaming environment or other artificial environment created using a suitable computer application. In such virtual environments, navigation points may not correspond to photo image capture locations in the real-world.

The Initial Input Set of Navigation Points

Techniques are described hereafter for automatically pruning one or more navigation points from an input set of navigation points. It should be noted that the techniques described herein for automated pruning of navigation points are not exclusive of other techniques for selecting navigation points for pruning. For example, a set of navigation points (such as all image-capture positions on which a 3D model of a real-world environment is based) may first be pruned manually by a user to produce a set of manually-pruned navigation points. That manually-pruned input set of navigation points may then be automatically pruned according to the automated pruning techniques described herein. For example, the user may interact with a computer user interface that allows the user to individually, or on a group-basis, select navigation points in the initial set for pruning. The same interface may have controls that allow the user to then invoke the automatic pruning of the navigation points that remain after the manual pruning. Additionally, or alternatively, the user interface may allow the user to invoke the automatic pruning on an input set of connected navigation points to obtain a reduced set of connected navigation points, which the user can then manually adjust (e.g. manually prune, or restore navigation points that were automatically pruned).

In some situations, the initial input set of connected navigation points corresponds to all image-capture locations in a real-world environment on which construction of a 3D model of the real-world environment is based. In other situations, the initial input set may correspond to a subset of all image-capture locations. For example, the initial input set may correspond to all image-capture locations in a selected portion of a real-world environment, such as a particular room or a particular floor of a building. As another example, the initial input set may correspond to image-capture locations selected randomly or pseudo-randomly from among all image-capture locations. As yet another example, cluster analysis may be performed on a set of image-capture locations to identify clusters of image-capture locations, where the image-capture locations in each cluster are close in spatial proximity to each other. An initial input set may then correspond to all the image-capture locations in an identified cluster.

Navigation-Point Graph

Once an input set of connected navigation points is obtained, the input set may be represented as a connected graph having nodes and edges therebetween. Each navigation point in the input set is represented by a node in the graph. An edge between two nodes in the graph represents adjacency of the two navigation points represented by the two nodes connected by the edge.

As mentioned earlier, navigation points are adjacent if there is unidirectional line-of-sight navigation between them. Between two navigation points between which line-of-sight navigation exists, it may exist in both directions, or in some cases, in only one direction. Preferably, line-of-sight navigation exists in both directions between adjacent navigation points. This allows the user to navigate back to an initial navigation point through an adjacent navigation point to which the user previously navigated from the initial navigation point. However, line-of-sight navigation may not exist in one direction between two adjacent navigation points for a variety of reasons.

One reason line-of-sight navigation may not exist in one direction between two adjacent navigation points is because a photo image of the location corresponding to one of the navigation points may have been captured such that the location is not viewable, in the virtual environment, from the viewing location corresponding to the other navigation point. For example, a location in a hallway may have been captured from a photo image-capture location in an adjacent kitchen but the location in the kitchen may not have been captured from the location in the hallway because of a door between the hallway and the kitchen may have been closed when the photo images in the hallway were captured. Because of the closed door, the kitchen may not viewable in the virtual environment from the hallway even though the hallway is viewable from the kitchen.

For purposes of techniques described herein, in the case where line-of-sight navigation exists in only one direction between two navigation points, the navigation points may still be considered adjacent and the set of navigation points to which the two navigation points belong may still be considered connected.

The navigation-point graph may be stored and programmatically manipulated in computer storage media as a data structure suitable for representing a graph. Preferably, the graph data structure has data structure elements representing nodes of the graph and data structure elements representing edges of the graph. The data structure elements for the nodes may include information identifying the corresponding navigation-point markers that the nodes represent. Such node information may include information identifying the corresponding navigation-points markers and/or coordinates identifying locations of the corresponding navigation-point markers. For example, the coordinates may identify the locations in a 3D coordinate space of a 3D model representing the spatial dimensions of the real-world environment that is modeled. The data structure elements for the edges may associate (e.g., by pointers, by reference, or by identifiers) the data structure elements of the nodes that the edges connect.

As mentioned, according to at least one selection factor, a navigation point is not removed from the input set if the removal will cause the remaining navigation points in the input set to no longer be connected. The data structure representing the graph may be used to programmatically determine whether pruning a navigation point from an input set of connected navigation points will continue to result in a connected set of navigation points after the pruning.

For example, based on (a) the data structure elements for the nodes of the graph, and (b) data structure elements for the edges of the graph, it can be determined whether a candidate navigation can be pruned. Specifically, a candidate navigation point should not be pruned if removal of the node that represents the candidate navigation point (and the edges to which that is connected) from the graph would cause any of the remaining nodes in the graph to be disconnected. On the other hand, a candidate navigation point may be pruned if removal of the node that represents the candidate navigation point (and the edges to which that is connected) from the graph would not cause any of the remaining nodes in the graph to be disconnected.

Upon determining that a candidate navigation point should be removed from the input set, the data structure representing the graph may be modified to represent that the candidate navigation point has been pruned from the input set. For example, the data structure elements for the node representing the candidate navigation point may be modified in storage media to indicate that the candidate navigation point has been pruned. One way in which the pruning may be indicated is by using a "pruned-bit" as an attribute of each node in the graph. Specifically, the data structure elements for the node may include a pruned-bit or Boolean value that can be set to indicate that the corresponding candidate navigation point has been pruned from the input set. Alternatively, the data structure elements for the node may be removed or deleted from the data structure representing the graph to indicate that the candidate navigation point has been pruned.

Navigation-Point Coverage

As mentioned above, the coverage of an individual navigation point refers generally to the portion of the virtual environment that is visible from that navigation point. More specifically, the amount of coverage space a navigation point is considered to cover may correspond to line-of-sight visibility in the virtual environment from the viewing position corresponding to the navigation point. For example, the amount of space may be calculated as a geometric surface area of, or volume within, a 3D model representing the virtual environment. While in one embodiment the coverage of a navigation point is considered to have a uniform distribution over a space, in an alternative embodiment the coverage of a navigation point is considered to have a non-uniform distribution over a space where the "density" of the coverage decreases as a function of distance from a center of the space. Thus, instead of calculating the coverage space as a geometric area or volume where a uniform distribution of coverage is assumed, the coverage space may instead be calculated based on a non-uniform distribution of coverage over the space. However calculated, the amount of coverage space may be represented in a computer storage media as a quantitative value.

The amount of coverage of a navigation point may be calculated based on a 2D or 3D Cartesian coordinate space of the 3D model of the real-world environment that the virtual environment represents. The coordinate space may represent spatial dimensions of the real-world environment modeled by the virtual environment. Thus, the coverage of a navigation point in the virtual environment may correspond to a real-world space at a location in the real-world environment corresponding to the navigation point.

Also, as mentioned herein, a navigation point may be selected as a candidate for pruning based on the amount by which coverage of the input set of navigation points will be reduced by pruning the navigation point from the input set. More specifically, between two navigation points, the one providing the least exclusive coverage may be selected as a candidate for pruning. By doing so, the visual clutter of navigation-point markers in the virtual environment is reduced while minimizing the loss of total coverage provided by the input set of candidate points.

The coverage that a navigation point is considered to have may vary based on the type of real-world environment that is modeled by the virtual environment. For example, if the virtual environment models the interior of a house or other building, then a navigation point might be considered to cover an area of a floor of the building corresponding to the navigation point. For example, the covered area of the floor could be measured as the area of a circle having a center at the navigation point and a radius corresponding to the distance of a clear line of sight from the viewing position in the virtual environment corresponding to the navigation point. That radius might be 2 or 4 meters, for example. However, the dimensions of an area or volume that a navigation point is considered to cover may vary depending on a variety of factors according to the requirements of the particular implementation at hand, including but not limited to the type of real-world environment that is modeled by the virtual environment.

The geometry of the coverage area of a navigation point can be more complex than a circle. Virtually any 2D geometry can be used including, but not limited to, an oval, an ellipse, or a more complex shape having complex curves.

The coverage that a navigation point has can be modeled as a volume, rather than as an area. For example, the coverage of a navigation point may have spherical or hemispherical dimensions, or dimensions based on more complex 3D geometries such as, for example, an ovoid, a spheroid, or an ellipsoid, or even more complex 3D shapes with complex curved surfaces.

Reduced Coverage of Navigation Points Near Objects

Without accounting for objects in the virtual environment, two navigation points may have the same amount of coverage. However, according to one embodiment, the coverage determination takes into account such objects. When taking account of such objects, the coverage of a navigation point may be reduced because its coverage intersects the boundaries of objects in the virtual environment through which the user cannot navigate. For example, a navigation point that is near, in the virtual environment, to a wall of a room in a house may be considered to provide less coverage than a navigation point that is in the center of the room. This may be because the user's line of sight in the virtual environment from the viewing position corresponding to the navigation point near the wall may be limited by the wall to a greater extent than from the viewing position corresponding to the navigation point in the center of the room.

The reduction in coverage of a navigation point caused by a nearby object in the virtual environment may be calculated based on the portion of coverage of the navigation point that extends beyond the boundary of the object. The boundary of the object may be determined, for example, based on a 3D mesh of the 3D model that defines the 3D surface of the object. For example, if the coverage of a navigation point is modeled as a circle where the circle corresponds to a location on or above and parallel with the floor of a room of a house, the reduction in coverage of the navigation point may be calculated as the area of the circle that extends beyond the 3D mesh for the surface of the wall according to the 3D model.

It should be noted that a navigation point that is near an object through which the user cannot navigate may be more likely to be selected as a candidate for pruning than a navigation point that is not near such an object. Specifically, according to a selection factor based on minimizing the reduction in coverage of the input set of navigation points when a navigation point is pruned from the input set, a navigation point that has reduced coverage because it is located in the virtual environment near an object is more likely to be selected as a candidate for removal than a navigation point that does not have reduced coverage, if pruning the navigation point that is near the object reduces the total coverage of the input set of navigation points less than pruning that navigation point that is not near an object. Removing the navigation point that is near an object may also be desirable from the user's perspective because the user's line-of-sight in the virtual environment from the viewing position corresponding to that navigation point is more likely to be obstructed by the object because the viewing position is closer to the obstruction. Hence, the user may deem that viewing position to be less preferable to the viewing position corresponding to a navigation point that is not located as near to the object.

Example Process

An example process for automated selection of navigation points for navigating through a virtual environment will now be described. The process may be performed by a computing system comprising one or more processors and storage media that store one or more computer programs configured for execution by the one or more processors and where the one or more computer programs include computer-executable instructions for performing the steps of the process when executed. The process may be performed by the computing system in a variety of different contexts and performance of the process is not limited to any particular context. For example, the process may be performed in the context of rendering, or preparing to render, a 3D model of a real-world environment as a virtual environment on a conventional computer video display or in a VR headset. Additionally, or alternatively, the process may be performed on servers in the cloud before the 3D model is downloaded over the Internet for rendering.

FIG. 1 is a flowchart of the example process 100. The process 100 includes three high-level operations labeled 102, 104, and 106 in FIG. 1. Process 100 may be performed to efficiently prune an input set of connected navigation points to a reduced set of connected navigation points that still provides at least a threshold amount of coverage of the virtual environment and includes high utility navigation points for navigating through the virtual environment. Operations 102, 104 and 106 generally correspond to selecting a threshold coverage subset of navigation points, determining utility scores for the navigation points that are not selected to be in the threshold coverage subset (the "pruning candidates"), and pruning one or more of the pruning candidates based on the utility scores. Each of these operations shall now be described in greater detail.

It will be apparent from the description of process 100 herein that while operations 102, 104, and 106 are depicted in FIG. 1 in a certain order, those operations do not necessarily need to be strictly performed in the order depicted. For example, operations 102, 104, and 106 could be repeated in an iterative fashion in which a set of pruned navigation points resulting from performance of operation 106 of a current iteration is input to operation 102 at the next iteration.

It should be understood that process 100 is just one example of a process for pruning navigation points. Other processes within the scope of the present invention are possible. For example, a process may score a set of navigation points for navigation quality and prune the lowest or worst scoring navigation points while retaining a connected set of navigation points that provides at least a threshold amount of coverage in the virtual environment.

Selecting a Threshold Coverage Subset

At operation 102, a subset of navigation points is selected from an input set of connected navigation points. The input set of connected navigation points may be all navigation points in the virtual environment, or a subset thereof. For example, the input set of connected navigation points may correspond to all image-capture locations in the real-world environment based on which the 3D model of the real-world environment is constructed.

The subset of navigation points selected at operation 102 is referred to herein as a "threshold coverage subset" of navigation points. The threshold coverage subset is selected such that the subset provides at least a threshold amount of coverage in the virtual environment, while reducing the number of navigation points needed to provide the threshold amount of coverage.

If the input set is a subset of all navigation points in the virtual environment, then the threshold coverage subset may be selected manually (e.g., based on user input) or selected based on another automated process. For example, the threshold coverage subset may correspond to a portion of the real-world environment that is modeled such as, for example, a particular floor or floors, or a particular room or rooms of a building.

One possible way to automatically select the threshold coverage subset is to (a) compute the coverage of all possible combinations of navigation points in the initial input set, and then (b) select the combination that provides at least the threshold amount of coverage with the fewest number of navigation points. However, this approach is computationally inefficient, especially where the input set contains a large number of navigation points. Specifically, if there are n number of navigation points in the input set, then there are on the order of $2^n-1$ number of possible combinations to compute coverage for. Exponential complexity algorithms are generally considered impractical to implement with existing computer technology because of the time the algorithms take to complete, even with small input sets. For example, if the coverage of all possible combinations of one or more navigation points of an input set having 30 navigation points could be computed in one second using existing computer technology, it would still take over six months to compute the coverage for an input set having 54 navigation points. A more practical algorithm is needed. An example algorithm for computing the threshold coverage subset with polynomial complexity is described below with respect to FIG. 2.

Scoring the Pruning Candidates

The navigation points in the input set that are not selected to be part of the threshold coverage subset during operation 102 are referred to herein as the "pruning candidates". At operation 104, each of the pruning candidates is scored for navigation utility. Generally, a navigation quality score for a pruning candidate reflects the utility of the pruning candidate to the user for the purpose of navigating through the virtual environment. A navigation quality score may be based on a variety of different characteristics of the navigation point. For example, these characteristics may include the coverage provided the navigation point, the exclusive coverage provided by the navigation point, the proximity of the navigation point to an obstruction (e.g., a wall) in the virtual environment, the proximity of the navigation point in the virtual environment to another navigation point, and the quality of the photo images captured at the image-capture location corresponding to the navigation point. Techniques for computing navigation quality scores are described in greater detail below using examples.

Pruning Based on Utility Scores

At operation 106, the pruning candidates are considered for pruning, from the input set, based on their navigation quality scores. In one embodiment, the pruning analysis starts from the worst scoring pruning candidate and proceeds one by one to the best scoring pruning candidate until all pruning candidates have been considered for pruning. According to one embodiment, a pruning candidate is pruned if the input set of navigation points would continue to be connected after the pruning candidate is pruned from the input set of navigation points. If pruning a pruning candidate would result in the input set of navigation points being disconnected, then the pruning candidate is not pruned and the next pruning candidate is considered for pruning.

Selecting the Threshold Coverage Subset

Figure 2A:
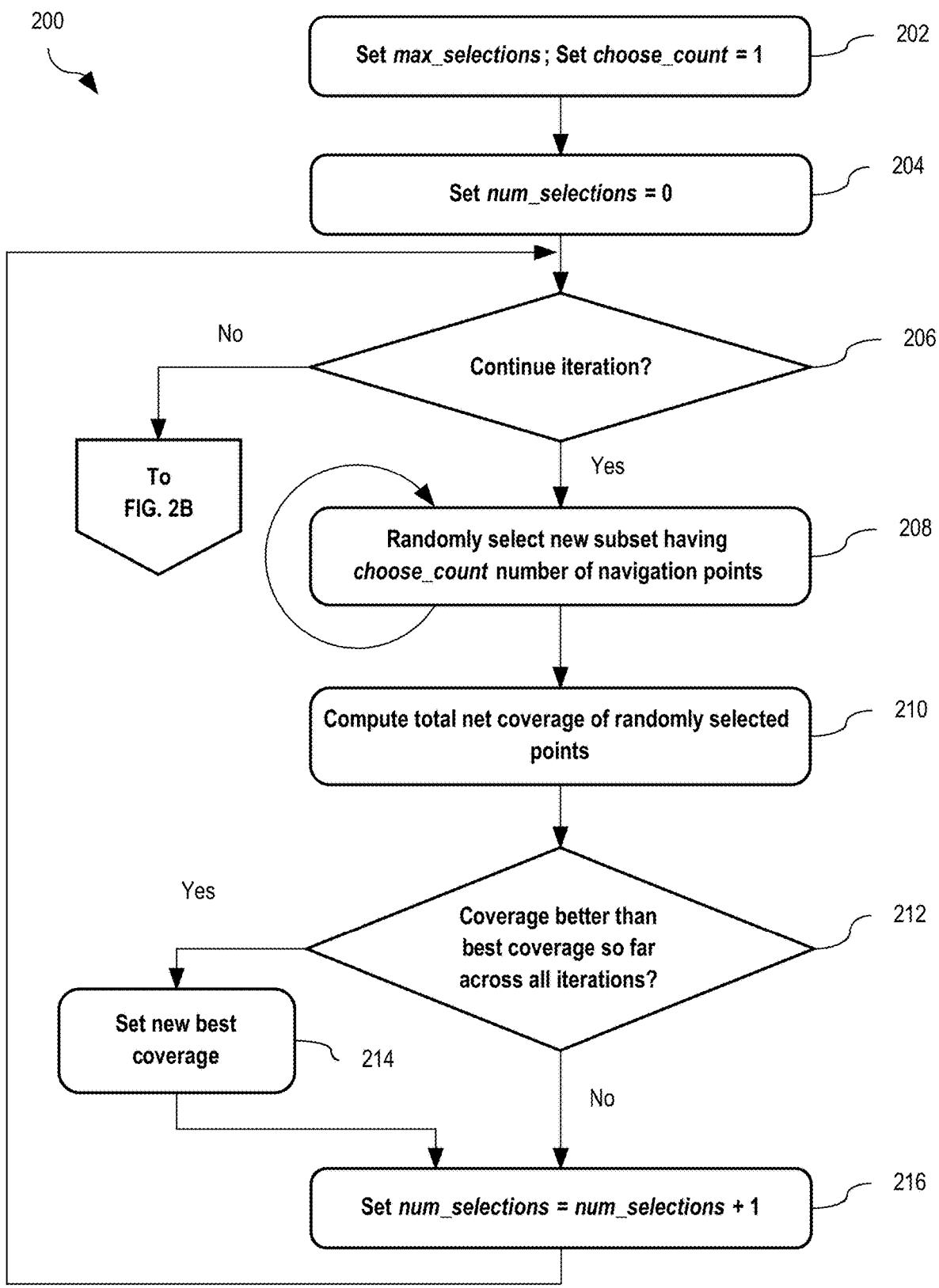
FIGS. 2A and 2B combined are a flowchart of an example process for selecting a threshold coverage subset of navigation points.
Figure 2B:
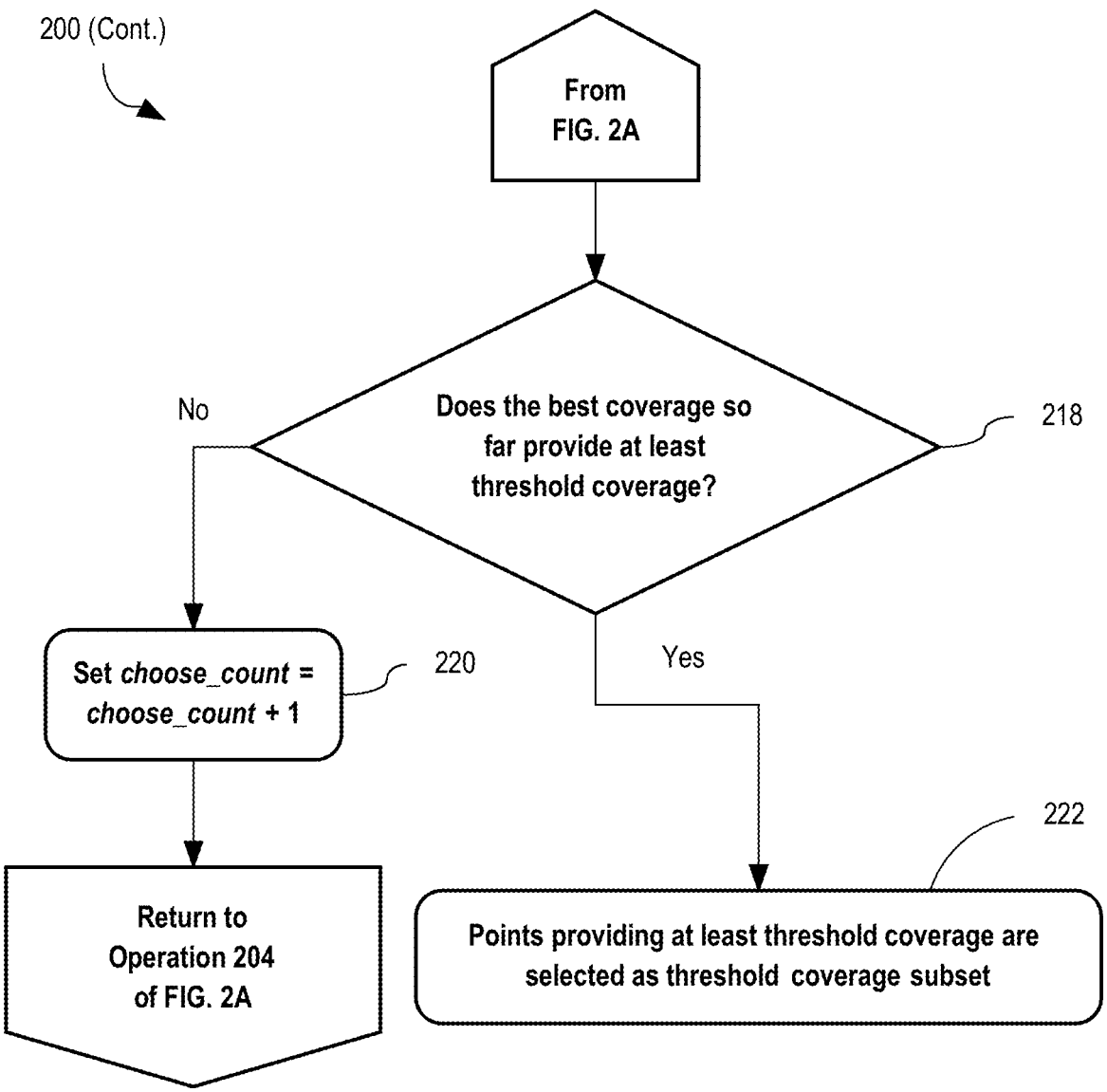

FIGS. 2A and 2B, combined, depict a flowchart of a process 200 for selecting a threshold coverage subset of navigation points that provides at least a threshold amount of coverage in the virtual environment while reducing the number of navigation points needed to provide at least the threshold amount of coverage. Process 200 may be performed as part of operation 102 of process 100 discussed above.

Process 200 has polynomial computational complexity and thus is computationally more practical that an algorithm having exponential computationally complexity such as one that exhausts all possible combinations of one or more navigation points. Generally, process 200 performs one or more iterations where, for each iteration, an increasing number of randomly chosen navigation points are selected from the input set, up to a maximum number of random selections per iteration. The random selection providing the best coverage so far is identified across iterations. If, after an iteration, the best coverage so far provides at least a threshold coverage, then those navigation points providing the best coverage so far are selected as the threshold coverage subset.

Turning now to FIG. 2A, at operation 202, at least two variables stored in computer storage media are set with initial values. The two variables are referred to herein for purposes of explanation as "max_selections" and "choose_count". Both could be named differently according to the requirements of the particular implementation at hand.

At operation 202, the max_selections variable is set to the maximum number of random selections to make per iteration. The value chosen to set the max_selections variable to may vary according to the requirements of the particular implementation at hand including, but not limited to, the number of navigation points in the input set, the computer processing power (e.g., CPU speed) of the computing system performing process 200, and the number of selections required to ensure that a sufficient percentage of the possible combinations of the navigation points in the input set are considered for certain input set sizes and certain choose_count values. For example, with existing computer processing capabilities, the max_selections variable may be set at an integer value in the millions. For example, if the number of navigation points in the input set is 40 and the choose_count is 6, then there are 40 choose 6 or 3,838,380 possible unordered combinations of navigation points in the input set. If the max_selections variable is set, for example, to 3,000,000, then at least up to that many combinations will be considered.

Initially, at operation 202, the choose_count is set to 1 before the start of the first iteration and, at operation 220, increased by 1 after completing an iteration and before starting the next iteration so long as a threshold coverage subset has not yet been determined.

At operation 204, at the start of an iteration, a variable representing the number of random selections made so far during the current iteration is set to 0. For purposes of explanation, the variable is referred to herein as "num_selections", but could be named differently according to the requirements of the particular implementation at hand. The num_selections variable is increased after each selection during the current iteration at operation 216.

At operation 206, it is determined whether the current iteration should continue. It may be determined that the current iteration should not continue if the current value of the num_selections variable is no longer less than (e.g., now equals) the current value of the max_selections variable. It may also be determined that the current iteration should not continue if all possible unordered combinations of navigation points of the input set of set size choose_count have already been selected during the iteration. The unordered combinations already selected during an iteration may be tracked during the iteration. The iteration can stop at operation 206 if all possible unordered combinations have already been selected during the iteration. If the iteration should continue because the current value of the num_selections variable is less than the current value of the max_selections variable and all possible unordered combinations of navigation points of the input set having a set size equal to the current value of the choose_count variable have not already been selected during the current iteration, then process 200 proceeds to operation 208.

At operation 208, a subset of navigation points is randomly selected from the input set. The subset has a set size equal to the current value of the choose_count variable. For example, if the input set has 40 navigation points and the current value of the choose_count variable is 5, then 5 navigation points are randomly selected from among the 40 total navigation points. The random selection can be made based on a pseudo-random number generator. Although, a truly random number generator may be used as well. If the subset has already been randomly selected during the current iteration, then process may repeat operation 208 as often as necessary to randomly select a new subset that has not yet been selected during the iteration. That is, if the same unordered combination of navigation points has already been randomly selected during the current iteration, then process may repeat operation 208 as often as necessary to randomly select a new unordered combination of navigation points that has not yet been selected during the current iteration.

At operation 210, the total net coverage of the navigation points randomly selected at operation 208 is computed. The total net coverage may be computed as the union of the coverage of the randomly selected navigation points minus any reduction in coverage from other navigation points in the input set that overlap the union of coverage and minus any reduction in coverage resulting from the union of coverage extending beyond the boundaries of mesh of the 3D model representing navigation obstructions (e.g., walls) in the virtual environment. As example of computing the total net coverage is provided below.

At operation 212, if the total net coverage computed at operation 210 provides the best (greatest) total net coverage computed so far across all iterations performed so far, then, at operation 214, the selected subset of random selected navigation points is saved as providing the best (greatest) total net coverage computed so far across all iterations performed so far. Regardless, if the total net coverage computed at operation 210 provides the best (greatest) total net coverage computed so far, the process 200 proceeds to operation 216 where the num_selections variable is incremented by 1. The process 200 then returns to operation 206 to determine if the current iteration should continue.

If the current iteration should not continue, then the process proceeds to operation 218 (FIG. 2B). At operation 218, it is determined whether the best (greatest) total net coverage determined so far, across all iterations performed so far, provides at least a threshold amount of coverage. The best (greatest) total net coverage determined so far, across all iterations performed so far, is referred to herein as the "current-best-coverage".

There are various ways to determine whether the current-best-coverage provides at least the threshold amount of coverage. In one possible way, the current-best-coverage provides at least the threshold amount of coverage at operation 218 if the difference between the total net coverage of all navigation points in the input set and the current-best-coverage is below a threshold. In another way, the current-best-coverage provides at least the threshold amount of coverage at operation 218 if the difference between (a) the best (greatest) total net coverage among all selections made during the just completed iteration where the choose_count equals n and (b) the best (greatest) total net coverage among all selections made during the iteration prior to that iteration where the choose_count equals n−1 is below a threshold. An example of determining the current-best-coverage, across all iterations performed so far, is provided below.

If it is determined at operation 218 that the current-best-coverage does not provide at least the threshold amount of coverage, then the choose_count variable is incremented by 1 at operation 220 and the process returns to operation 204 to perform another iteration, this time with a greater choose_count.

On the other hand, if it is determined at operation 218 that the current-best-coverage provides at least the threshold amount of coverage, then the subset of navigation points providing the current-best-coverage is selected as the threshold coverage subset.

As mentioned, process 200 may be performed as part of operation 102 of process 100 to select the threshold coverage subset. However, process 200 is not the only way to select the threshold coverage subset and other computationally practical processes may be used instead or in conjunction with process 200. For example, coverage subsets may be determined by both process 200 and another polynomial time process. Between the two coverage subsets thus produced, the coverage subset providing at least a threshold amount of coverage with the fewest navigation points may be selected as the threshold coverage subset. Thus, selection of the threshold coverage subset is not limited to being performed according to process 200. Regardless of how the threshold coverage subset is selected, the remaining navigation points may be scored for navigation quality.

Scoring Navigation Points for Navigation Quality

As mentioned above, the navigation points in the input set that are not selected for inclusion in the threshold coverage subset qualify as "pruning candidates. At operation 104, the pruning candidates are scored for navigation quality. Then, the scored navigation points may be pruned at operation 106 considering the scored navigation points for pruning in turn from the lowest score to the highest score. However, also as mentioned above, a navigation point is not pruned if the input set of navigation points would no longer be connected if the navigation point were pruned.

As mentioned, a navigation quality score for a navigation point may be based on one or more of a variety of different characteristics of the navigation point. For example, these characteristics may include the coverage provided by the navigation point, the exclusive coverage of the navigation point, the proximity of the navigation point to an obstruction (e.g., a wall) in the virtual environment, the proximity of the navigation point in the virtual environment to another navigation point, and the quality of the photo images captured at the image-capture location corresponding to the navigation point.

With the respect to the coverage provided by a navigation point, generally the more coverage provided by the navigation point after any reductions in coverage due to covering space beyond mesh boundaries or because of coverage overlap with other navigation points, the greater the navigation utility and hence the greater the navigation quality score for the navigation point. This is because a user is likely to consider a navigation point that provides more line-of-sight visibility of the virtual environment from the viewing position corresponding to the navigation point to have greater utility than a navigation point that provides less line-of-sight visibility. A navigation point that has a higher navigation quality score than another navigation point in the input set may reflect that the higher scoring navigation point provides more net coverage of the virtual environment than the other navigation point.

With respect to the proximity of a navigation point to an object (e.g., a wall) in the virtual environment, a user is likely to consider a navigation point that is closer to a mesh boundary in the virtual environment to have less utility than a navigation point that is farther away from a mesh boundary because the object represented by the mesh boundary may obstruct or constrain line-of-sight visibility in the virtual environment from the viewing position corresponding to the navigation point that is closer to the mesh boundary. A navigation point that has a higher navigation quality score than another navigation point in the input set may reflect that the higher scoring navigation point is located farther away from a mesh boundary than the other navigation point.

With respect to the proximity of a navigation point in the virtual environment to another navigation point, a user is likely to consider a navigation point that is closer to another navigation point to have a less utility than a navigation point that is not as close to any other navigation point because the navigation points that are closer to each other are more redundant of each other when compared to a navigation point that is not as close to another navigation point. A navigation point that has a higher navigation quality score than another navigation point in the input set may reflect that the higher scoring navigation point is located farther away from any other navigation point in the input set than the other navigation point.

With respect to the quality of the photo images captured at the image-capture location corresponding to a navigation point, a user is likely to consider a navigation point with higher-quality photo images used to render what is viewable by the user from the viewing position corresponding to the navigation point when compared to another navigation point where lower-quality photo images are used. Photo image quality may be measured according to a variety of different criteria and no particular criteria is required. For example, photo image quality may be measured based on photo image resolution, level of blurriness, sharpness, or other photo image quality metrics.

Photo image quality may additionally or alternatively be automatically measured according to a content-based quality assessment approach. According to one possible approach, regional and global features of a photo image are selected and combined to assess quality. More specifically, subject areas of the photo image are extracted. This extraction may be accomplished using a variety of different subject area extraction techniques including, for example, a clarity-based region detection technique to extract clear regions in the image, a layout-based region detection technique that analyzes the layout structure of the image and extracts vertical standing objects in the image, and a human-based detection techniques that locates faces in the image. Based on the extracted subject areas, various global and regional feature measurements may be made including, for example, a dark channel feature that measures the clearness and colorfulness of the subject areas, a complexity feature that measures the spatial complexity of the subject areas and the background, a human-based feature that measure the clarity, brightness, and lighting effects of human faces in the image, a hue composition feature that fits the photo image with a color composition scheme, and a scene composition feature that captures the spatial structure of photos from semantic lines. The various features are then combined according to a supervised machine learning approach. For example, the various features may be combined by a support vector machine (SVM) trained on a set of representative photo images.

Each of the characteristics may be represented as a quantitative value. If the navigation quality score for a navigation point is based on just one characteristic, then the navigation quality score may be taken as the quantitative value that represents the one characteristic, or a quantitative value based on thereon. If multiple characteristics are combined to produce the navigation quality score, the quantitative values representing the multiple characteristics may be normalized and weighted where the weights result in different contributions of the various characteristics to the overall navigation quality score. For example, the navigation quality score for a navigation point may be computed as the sum or product of weighted quantitative values representing the multiple characteristics.

Learning Navigation Quality

While the weights that are applied to quantitative values representing the characteristics on which computation of the navigation quality score is based can be predefined, they can also be learned based on actual navigation patterns of users according to a supervised machine learning process. For example, the dwell times of the navigation points that users actually visit may be recorded. The dwell times may be used as indication of navigation quality. For example, if users dwell on (e.g., do not navigate away from) a particular navigation point for long time (e.g., more than 10 seconds), it can be taken as an indication that the particular navigation point is of "high" navigation quality. On the other hand, if users quickly navigate away from the particular navigation point after arriving there (e.g., within 3 seconds), it can be taken as an indication in the particular navigation point is of "low" navigation quality. Dwell times in between what is a considered a long dwell time (e.g., more than 10 seconds) and what is considered a short dwell time (e.g., less than 3 seconds) can be considered as indicative of navigation points of "neutral" navigation quality.

Other navigation quality inferences can be made based on the activity of actual user navigation other than dwell time. For example, if it is known that a user viewed a navigation-point marker for a navigation point but did not navigate to the navigation point, then it can be taken as an indication that the navigation point is of "low" or "neutral" navigation quality on the assumption that the user considered navigating to the navigation point but decided not to because the user perceived the viewing position corresponding to the navigation point to not be interesting or relevant. As another example, available navigation points that were not seen by the user during a navigation session and thus were not navigated to may be considered to have "unknown" navigation quality.

A training set for machine learning may be generated by labeling user visits to available navigation points with a quality label (e.g., "good", "medium", "low", "unknown"). For visited navigation points (which may be less than all of the navigation points that are available to be visited), the visits labeled may include just the first visits to the navigation points during a navigation session conducted by the user. Also stored with the quality labels can be the quantitative values of the characteristics used to calculate the navigation quality scores for the visited navigation points. Thus, for learning purposes, navigation quality scores can be calculated for navigation points in the threshold coverage subset even though those scores may not be used to prune those navigation points from the input set. Also stored with the quality labels can be information reflecting the ranking, or rank position, of each of the available navigation points according to their navigation quality scores.

Pairs of relationships may be identified between visited navigation points based on the quality labels. For example, a "good" navigation point should have had a higher navigation quality score than each "neutral" navigation point and each "poor" navigation point. Note that this may not be the case depending on the weights used in the function to calculate the navigation quality scores. Because the current weights used to derive the navigation quality scores may not be optimal, the machine learning process may be used to learn more optimal weights. Similarly, each "neutral" navigation point should have had a higher navigation quality score than each "poor" navigation. Each "good" navigation point can also be paired with each "unknown" navigation point to provide more training data in situations where there are not many "neutral" or "poor" navigation points. The pairs of relationships may be used to establish a ground truth ranking of the available navigation points.

A cost function of the machine learning process, given a set of candidate weights, can compute navigation quality scores for each of the available navigation points. The available navigation points can then be ranked according to those scores. This ranking can then be measured according to a quality metric. One possible quality metric is the number of inversions required of the ranking to match the ground truth ranking. The number of inversions may be measured according to a Kendall Tau Distance, for example. The goal of an optimization algorithm of the machine learning process then, can be to find a candidate set of weights that minimizes the cost function (e.g., a candidate set of weights that minimizes the number of inversions needed to match the ground truth ranking). The optimal candidate set of weights may then be used in the navigation quality score function to select a new set of available navigation points from the input set.

Pruning the Remaining Navigation Points

As mentioned, once navigation quality scores have been computed for the pruning candidates, the pruning candidates may be pruned from the input set according to their navigation quality scores. The virtual environment may then be rendered with navigation-point markers for just (a) the navigation points in the threshold coverage subset and (b) the pruning candidates that were not pruned.

As mentioned above, one embodiment analyzes pruning candidates in an order based on their respective navigation quality scores, from the worst scoring to the best scoring. If removing a pruning candidate would not cause the input set of navigation points to become disconnected, then the pruning candidate is pruned. If pruning the navigation point would cause the input set to become disconnected, then the pruning candidate is not pruned and the next pruning candidate is considered for pruning.

Navigation Point Selection Example

An example of automatically selecting navigation points for navigating through a virtual environment will now be described with reference to FIGS. 3A-3B and FIGS. 4A-4E.

Figure 3A:
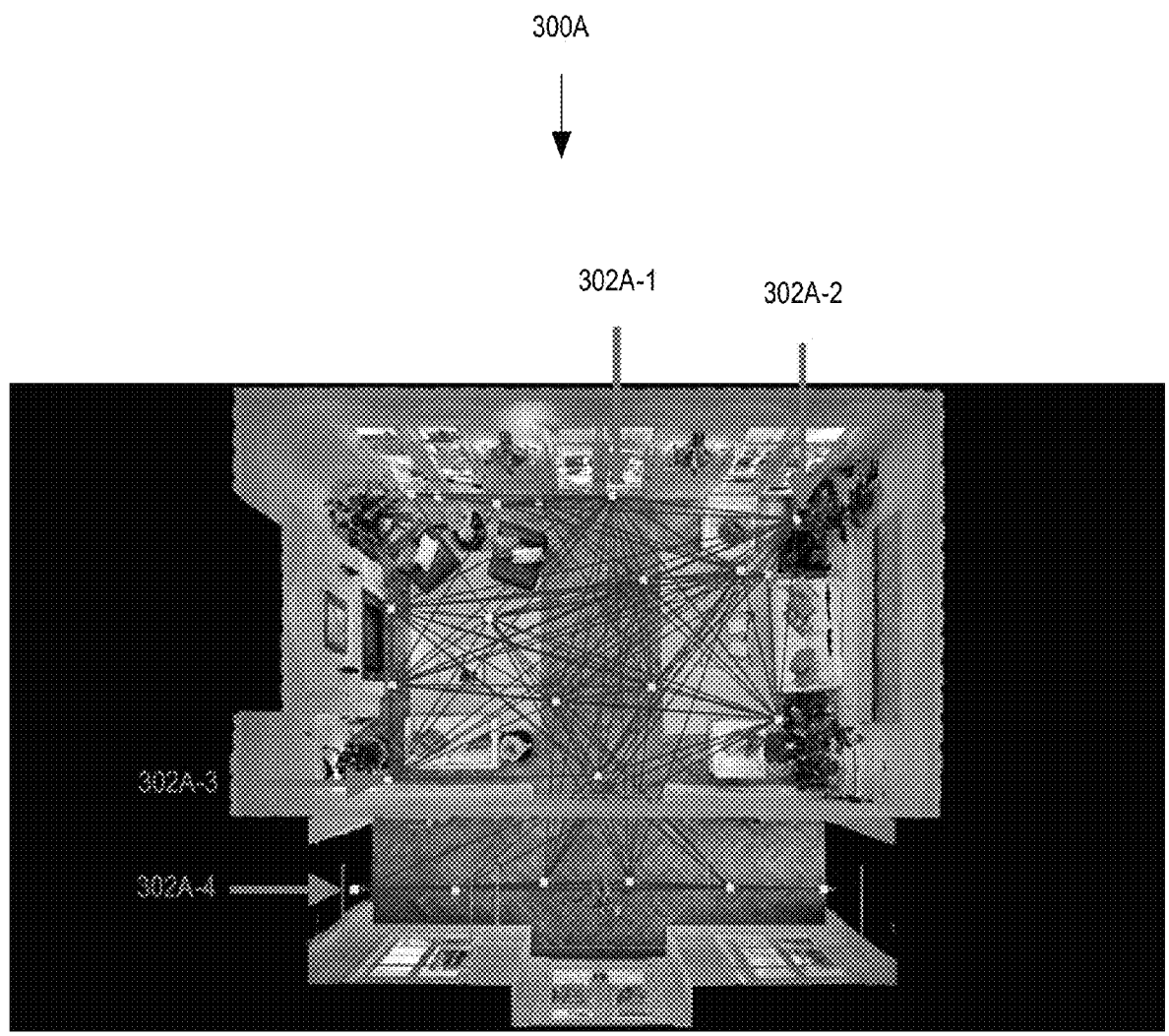
FIGS. 3A-3B show a top-down rendering of an example virtual environment as navigation points are pruned according to the example process for automated navigation point selection.

In this example, the virtual environment is of two rooms of a house connected by a common throughway. Turning first to FIG. 3A, it shows a top-down rendering 300A of the virtual environment based on a 3D model of the two rooms. Renderings providing other perspectives are possible. For example, a first-person rendering for navigating through the virtual environment is also possible. An example of a first-person rendering of a virtual environment showing navigation-point markers for navigation points is provided in FIG. 5.

A graphical overlay to the rendering 300A depicts a connected graph where the yellow nodes represent navigation points and the blue edges between the nodes represent adjacencies between the navigation points corresponding to the connected nodes. For example, nodes 302A-1 and 302A-2 represent navigation points that are adjacent to each other. On the other hand, as a result of the wall between the real-world locations corresponding to the navigation points represented by nodes 302A-3 and 302A-4, the navigation points are not adjacent to each other (as evidenced by the lack of a blue edge directly connecting nodes 302A-3 and 302A-4). In this example, each of the navigation points (represented as nodes in the graph) correspond to panoramic photo image-capture locations.

Figure 4A:
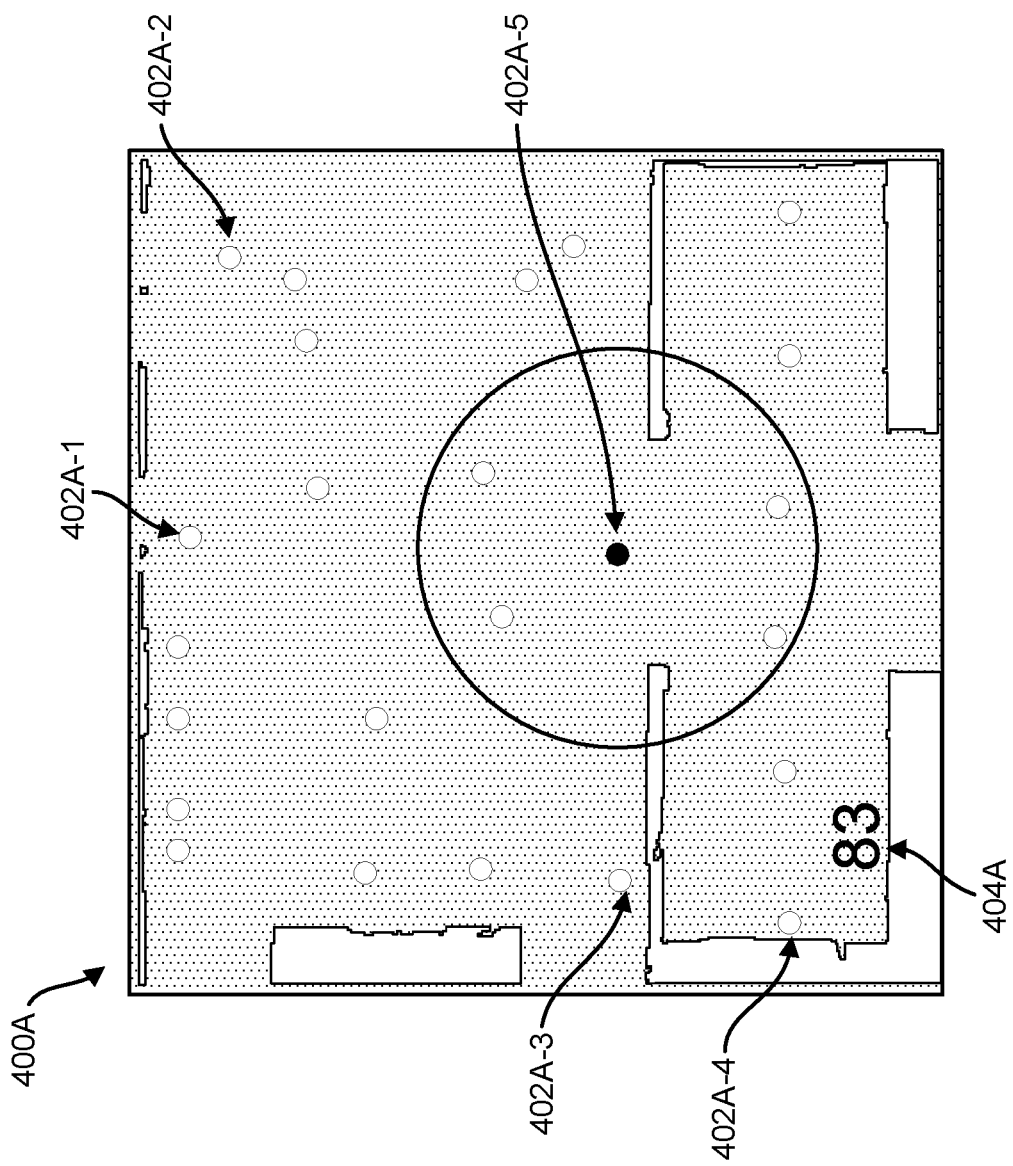

Turning now to FIG. 4A, it depicts the same virtual environment 400A as depicted in FIG. 3A. Specifically, FIG. 4A depicts the two rooms of the house from a top-down perspective. However, the photo images of the room are blacked-out for purposes of illustrating the example process 200 described above for selecting a threshold coverage subset of navigation points with respect to the example virtual environment. In FIG. 4A, navigation points 402A-1 through 402A-4 correspond to navigation points 302A-1 through 302A-4 of FIG. 3A, respectively.

In FIGS. 4A-4E, the coverage of a navigation point that is currently selected for inclusion in the current-best coverage subset is represented as a circle. In this example, the maximum coverage of a navigation point is a circle with a radius corresponding to X (e.g., 2.5) meter in a plane parallel to the floor of the room where the navigation point is located.

In the virtual environment 400A depicted in FIG. 4A The navigation point 402A-5 represents the navigation point selected as providing the best coverage after an iteration of process 200, where the choose_count variable is set to 1. Number 404A represents the difference between the total coverage provided by all of the navigation points in the input set and the total coverage provided by the current-best coverage subset that includes navigation point 402A-5.

Figure 4B:
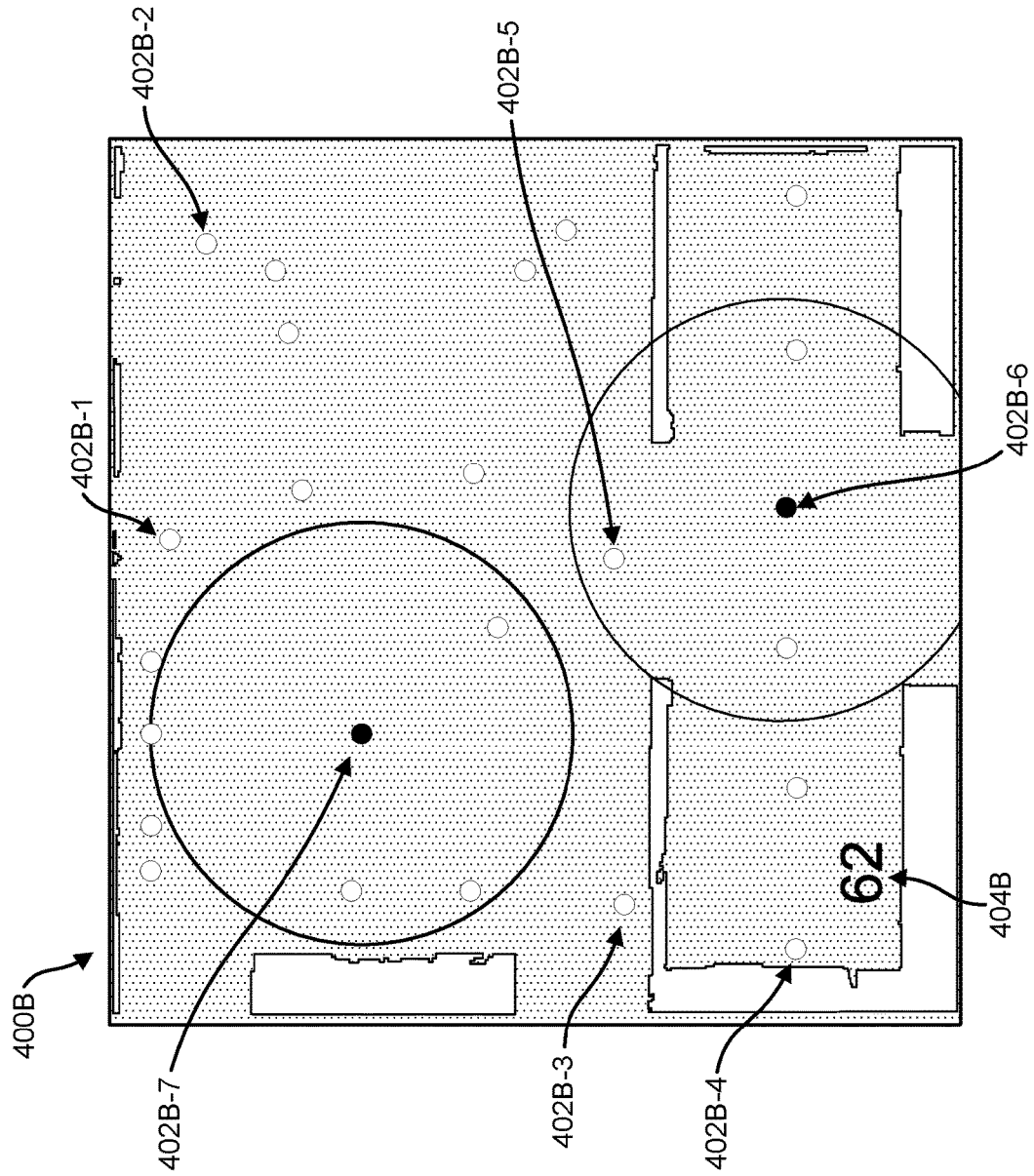

In the virtual environment 400B depicted in FIG. 4B, navigation points 402B-6 and 402B-7 represent the current-best coverage subset after one additional iteration of process 200, where the choose_count variable is incremented from 1 to 2. Navigation points 402B-1 through 402B-5 correspond to navigation points 402A-1 through 402A-5, respectively. Note that navigation point 402B-5 is no longer in the current-best coverage subset after the additional iteration. Also note that the coverage provided by navigation point 402B-6 is partially reduced by the mesh boundary. Number 404B represents the difference between the total coverage provided by all of the navigation points in the input set and the total coverage provided by the current-best coverage subset that includes navigation points 402B-6 and 402B-7.

Figure 4C:
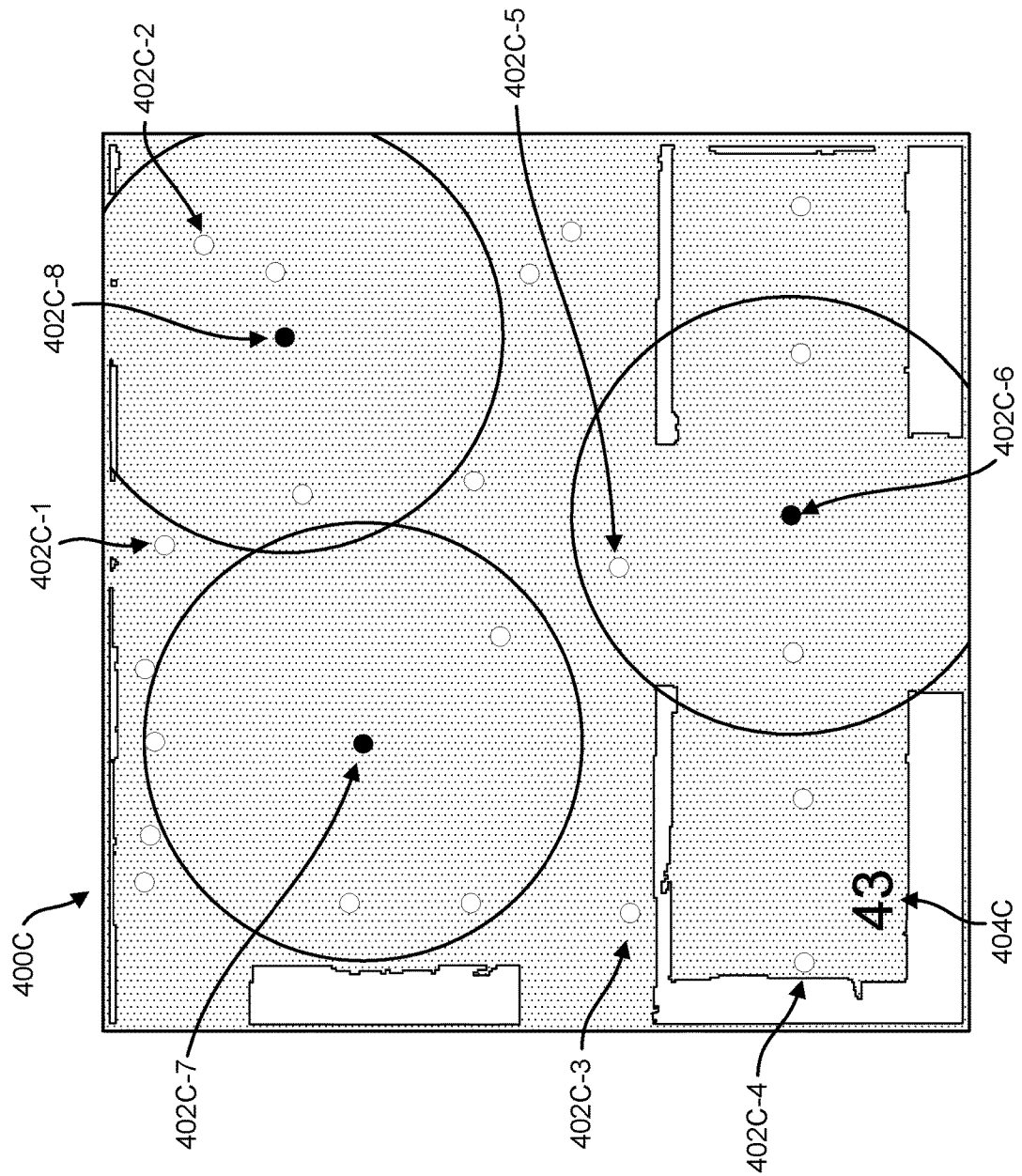

In the virtual environment 400C depicted in FIG. 4C, navigation points 402C-6, 402C-7, and 402C-8 represent the current-best coverage subset after another additional iteration of process 200, where the choose_count variable is incremented from 2 to 3. Navigation points 402C-1 through 402C-7 correspond to navigation points 402B-1 through 402B-7, respectively. The coverages of navigation points 402C-7 and 402C-8 overlap slightly. Number 404C represents the difference between the total coverage provided by all of the navigation points in the input set and the total coverage provided by the current-best coverage subset that includes navigation points 402C-6, 402C-7, and 402C-8.

In the virtual environment 400D depicted in FIG. 4D, navigation points 402D-7, 402D-8, 402D-9, and 402D-10 represent the current-best coverage subset after one additional iteration of process 200, where the choose_count variable is incremented from 3 to 4. Navigation points 402D-1 through 402D-8 correspond to navigation points 402C-1 through 402C-8, respectively. The coverage provided by navigation point 402D-9 is reduced by intersection with the mesh boundary. Same with navigation point 402D-10. Number 404D represents the difference between the total coverage provided by all of the navigation points in the input set and the total coverage provided by the current-best coverage subset that includes 402D-7, 402D-8, 402D-9, and 402D-10.

Figure 4E:
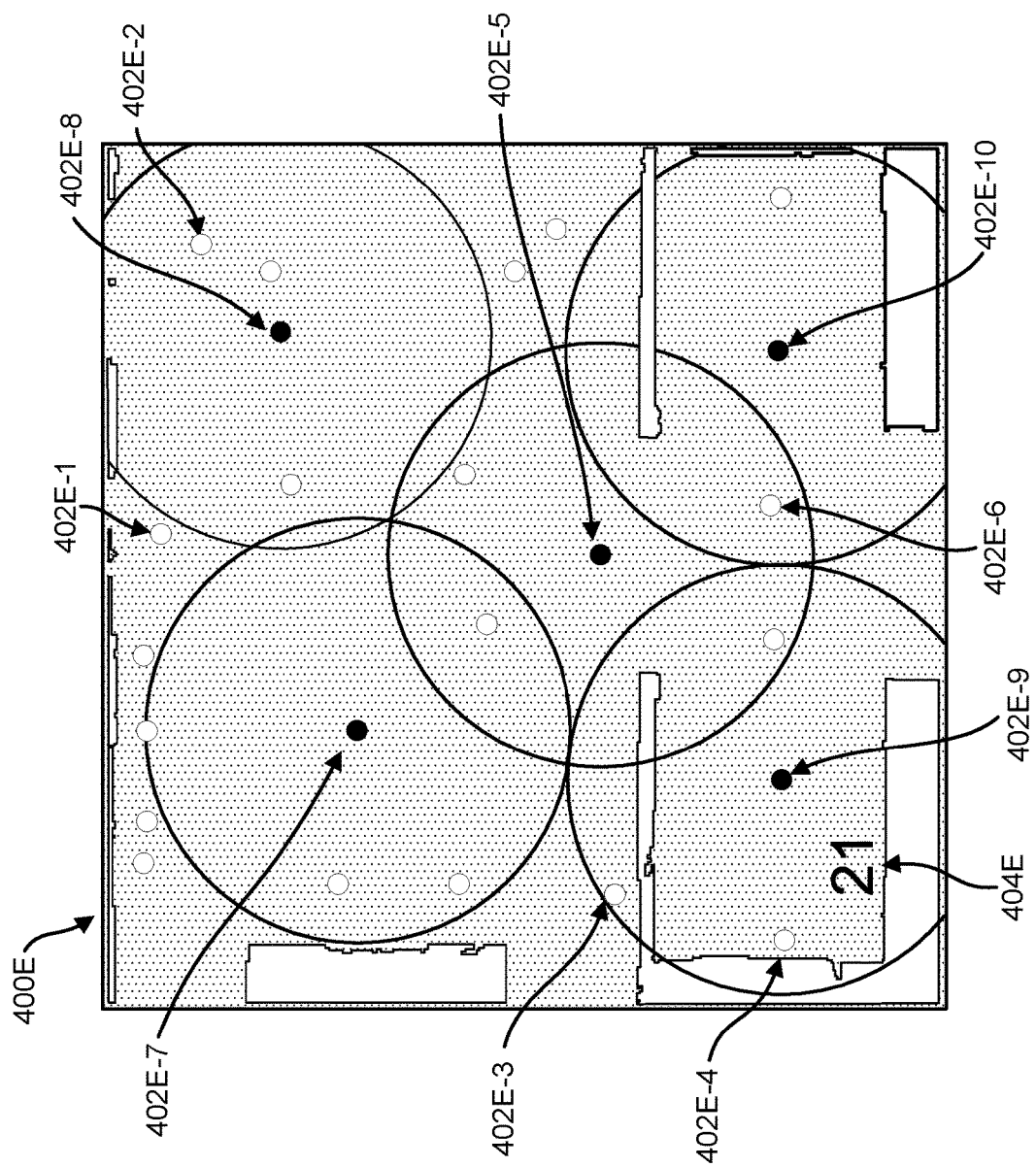

In the virtual environment 400E depicted in FIG. 4E, navigation points 402E-5, 402E-7, 402E-8, 402E-9, and 402E-10 represent the current-best coverage subset after one additional iteration of process 200, where the choose_count variable is incremented from 4 to 5. Navigation points 402E-1 through 402E-10 correspond to navigation points 402D-1 through 402D-10, respectively. The coverage of navigation point 402E-5 partially overlaps the coverages of navigation points 402E-7 through 402E-10. Number 404E represents the difference between the total coverage provided by all of the navigation points in the input set and the current-best coverage subset that includes navigation points 402E-5, 402E-7, 402E-8, 402E-9, and 402E-10. In this example, according to process 200, this set of navigation points provides at least a threshold amount of coverage (e.g., above a predetermined percentage (e.g., 75%) of the total net coverage provided by all navigation points in the input set) and is selected as threshold coverage sub set.

Figure 3B:
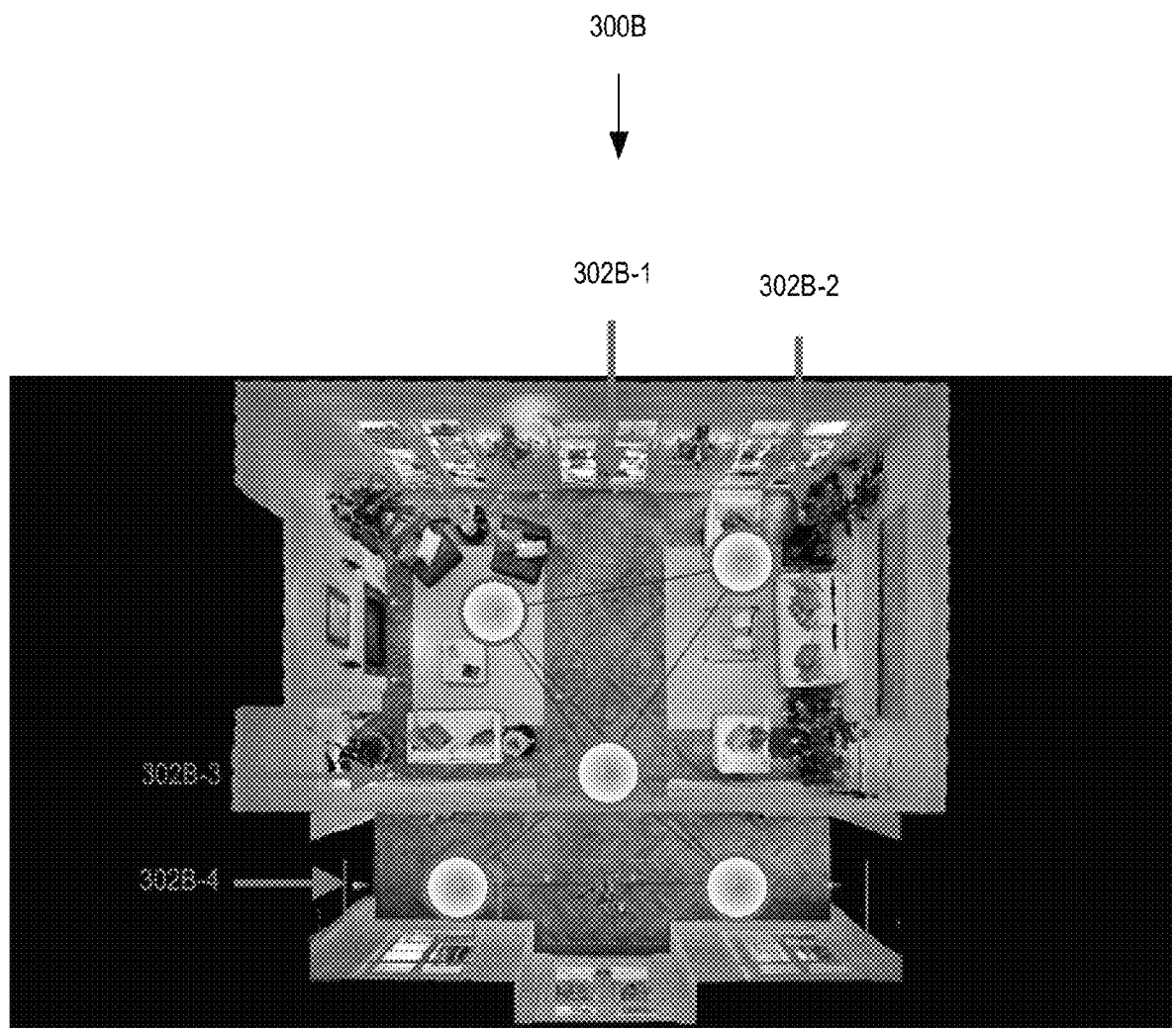

In FIG. 3B, the nodes corresponding to the navigation points selected for inclusion in the threshold coverage subset as shown in FIG. 4E are circled in green. In FIG. 3B, navigation points 302B1-4 correspond to navigations points 302A1-4 of FIG. 3A, respectively. Specifically, FIG. 3B shows the final set of navigation points after all of the remaining navigation points that can be pruned are pruned. In this example, all of the pruning candidates are pruned. However, it is possible that, with another input set of navigation points and/or a different virtual environment, a pruning candidate cannot be pruned because pruning the pruning candidate would cause the input set of navigation points to be disconnected.

Example First-Person Navigation

Figure 5A:
FIGS. 5A-5B show a first-person rendering of and navigation through an example virtual environment.
Figure 5B:
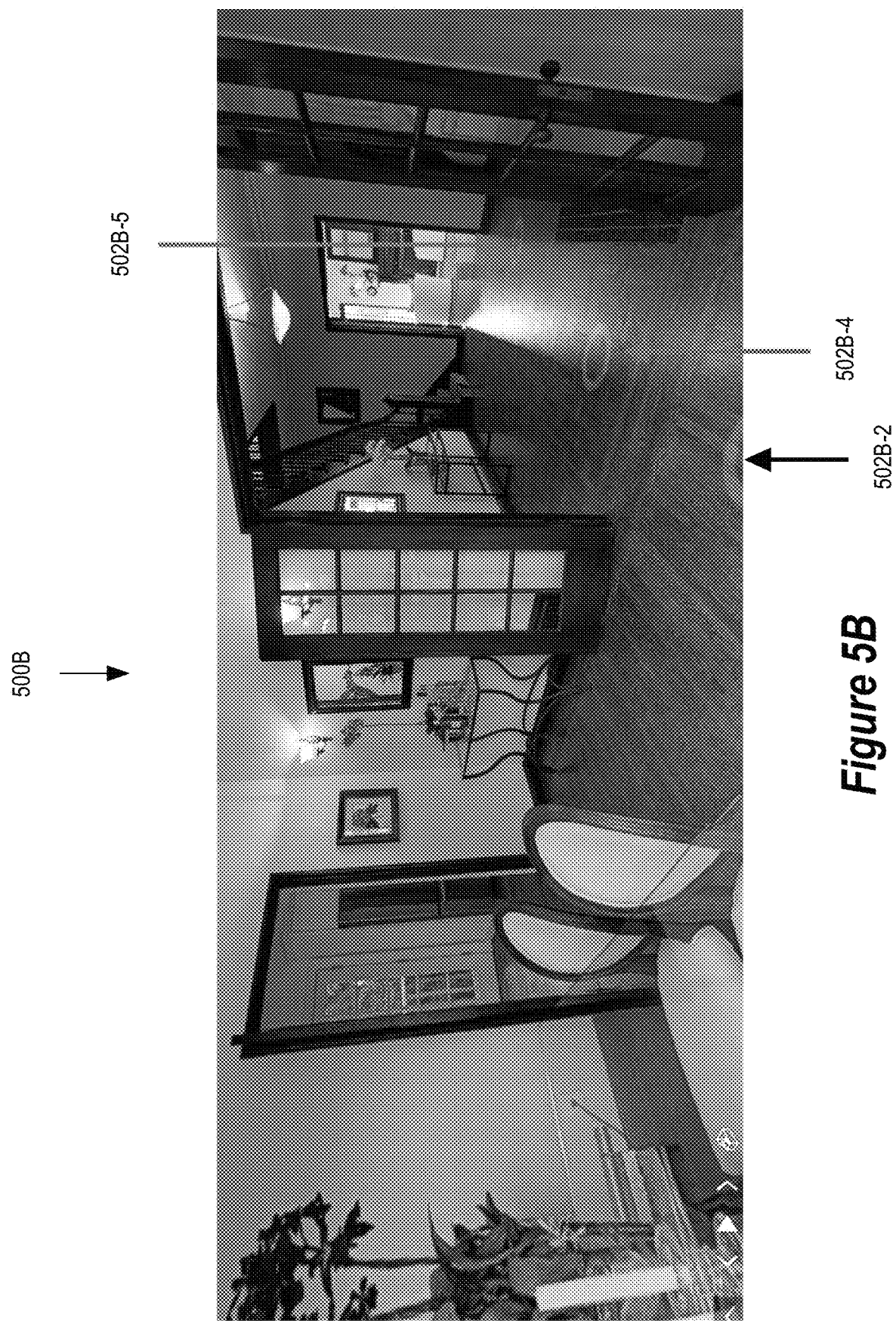

FIGS. 5A and 5B show a first-person view of another example virtual environment and illustrate navigating through a virtual environment using navigation point markers.

In FIG. 5A, the user has navigated to a panoramic navigation point. In view 500A, selectable navigation-point markers 502A-1, 502A-2, 502A-3, and 502A-4 for other panoramic navigation points are visible to the user from the viewing position corresponding to the navigation point.

FIG. 5B shows a view 500B in the virtual environment after the user has selected navigation-point marker 502A-1 from the viewing position shown in FIG. 5A, thereby changing the current navigation point to the one corresponding to navigation-point marker 502A-1. In FIG. 5B, the user's view 500B from the viewing position corresponding navigation-point marker 502A-1 is back towards the navigation point that was the current navigation point for view 500A (i.e., back toward the navigation point from which the user navigated). In view 500B, the user can see navigation-point marker 502B-4 corresponding to navigation-point marker 502A-4 in view 500A and see navigation-point marker 502B-2 corresponding to navigation point marker 502B-4 in view 500A. A navigation-point marker for the navigation point corresponding to navigation-point marker 502A-3 in no longer visible in view 500B. However, navigation-point marker 502B-5 for the previously visited navigation point is visible in view 500B allowing the user to navigate back to the previously visited navigation point.

Techniques described herein may be used to select navigation points for navigating through a virtual environment like the example virtual environment shown in FIGS. 5A and 5B.

Example Virtual Reality Navigation

FIGS. 6A-6E show an example of navigating through a virtual reality (VR) environment using navigation point markers. In each of FIGS. 6A through 6E, a snapshot view 600 of a virtual reality environment is depicted as experienced by a user wearing a VR headset or other stereoscopic head-mounted display that presents separate images to each eye. Each snapshot view 600A through 600E includes a left-eye image 602 and a right-eye image 604. The view that the user sees depends on the position, rotation, and orientation of the user's head while wearing the head-mounted display. In the examples snapshot views 600A through 600E, the views simulate what a user would see if standing in various different positions within a house.

In snapshot view 600A of FIG. 6A, a selectable navigation-point marker 606A is shown as a yellow sphere that appears to the user to float in the virtual reality environment. The user may navigate to the location in the virtual reality environment corresponding to the navigation-point marker 606A by selecting the navigation-point marker 606A.

The user may select the navigation-point marker 606A in a variety of different manners and selection is not limited to any particular manner. For example, the user may select the navigation-point marker 606A by positioning the head so as to direct gaze toward the navigation-point marker 606A for a threshold amount of time (e.g., 2½ seconds). The gaze location may be visibly marked to the user in the head-mounted display by a gaze cursor.

Figure 6B:
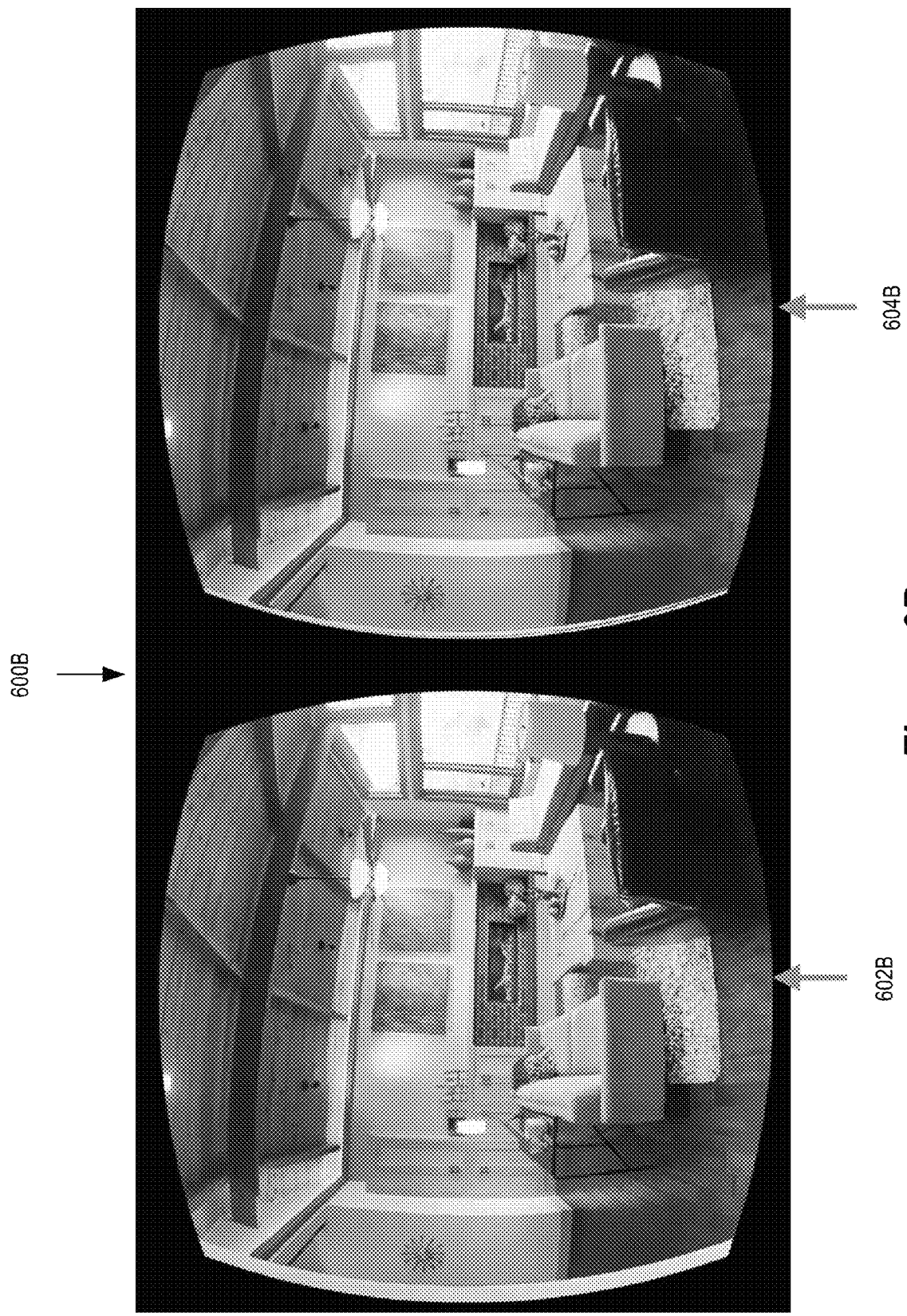

If the gaze is continuously maintained on the navigation-point marker 606A for the threshold amount of time, then the user's viewing position in the virtual reality environment transitions from the current viewing position to the viewing position corresponding to the navigation-point marker 606A. Snapshot view 600B of FIG. 6B shows a view from the viewing position corresponding to the navigation-point marker 606A after the user has selected navigation-point marker 606A.

The navigation-point marker 606A may visibly indicate to the user that gaze is directed toward it. For example, the navigation-point marker 606A may change color (e.g., from green to yellow) when the user initially directs gaze toward the marker 606A. This change in color indicates to the user that selection of the marker 606A is imminent. The marker 606A may remain colored this way (e.g., yellow) to indicate the selection is imminent while the user's gaze is maintained on the marker 606A until the threshold amount of time has elapsed, at which time the marker 606A is selected and the user is transitioned through the virtual reality environment to the viewing position corresponding to the marker 606A. If, instead, the user turns the gaze away from the marker 606A after initially placing it there, then the color of the marker 606A may revert to its selection-not-imminent color (e.g., green). By indicating imminent selection (e.g., by changing marker colors) and allowing some time for the user to contemplate the imminent selection up to the threshold amount of time, the user is prevented from making an inadvertent selection.

Figure 6C:
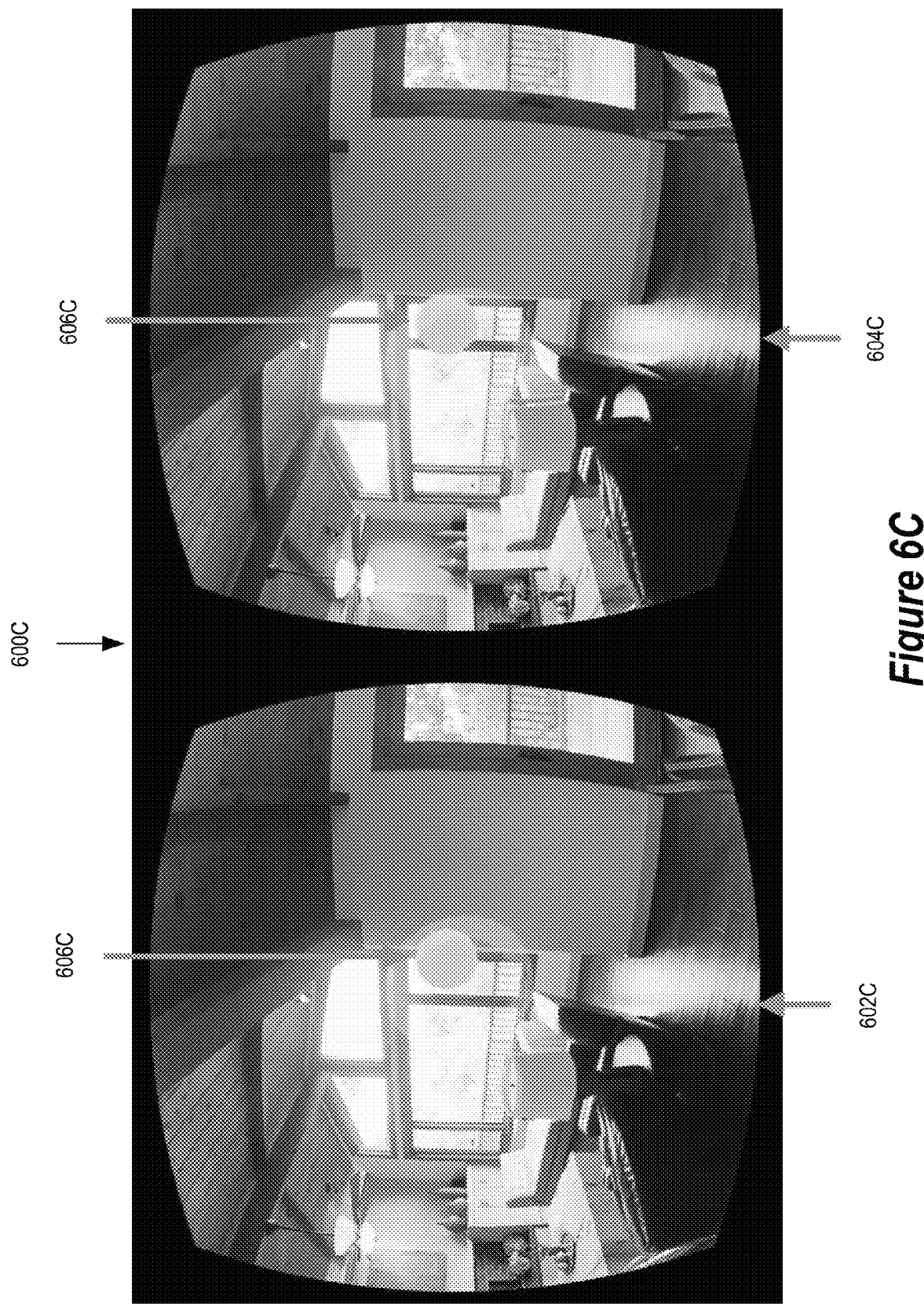
Figure 6D:

Snapshot view 600C of FIG. 6C shows another navigation-point marker 606C that is viewable from the viewing position corresponding to navigation-point marker 606A. Snapshot view 600D of FIG. 6D shows a view from the viewing position corresponding navigation-point marker 606C after the user has selected navigation-point marker 606C. Snapshot view 600E of FIG. 6E shows yet another navigation-point marker 606E that is viewable from the viewing position corresponding to navigation-point marker 606C.

While selection of a navigation-point marker can be made by maintaining gaze on the marker, selection of a marker can be made in other manners. For example, selection of a marker can be made by a user gesture via direct sensing of the user's hand (for example, with a three-dimensional sensor on the virtual reality headset) or via a handheld controller for which position and/or orientation can be tracked.

Gesture input can be used in a variety of ways. For example, the position of the hand or hand controller may be mapped relative to the headset in two dimensions to create a cursor that appears on the user's panoramic view in a three-dimensional virtual reality environment. This cursor could be used to select a navigation-point marker by moving it to overlap with the navigation-point marker's rendering in two dimensions and then engaging in a selection action. This selection action could include holding the cursor over the marker for a predetermined period of time or making a specific gesture (e.g., a forward tapping motion) that is detected by the hand or hand controller tracking system. Alternatively, if the orientation of the hand or the hand controller can be detected, the system can cast a ray in three dimensions from the position of the hand controller in the virtual environment. In this system, a user may select a navigation-point marker by orienting the ray to intersect a navigation-point marker in three dimensions and then performing an additional action such as tapping a button, uttering a command, or keeping the ray pointed at the marker for more than a predetermined period of time.

Figure 7:
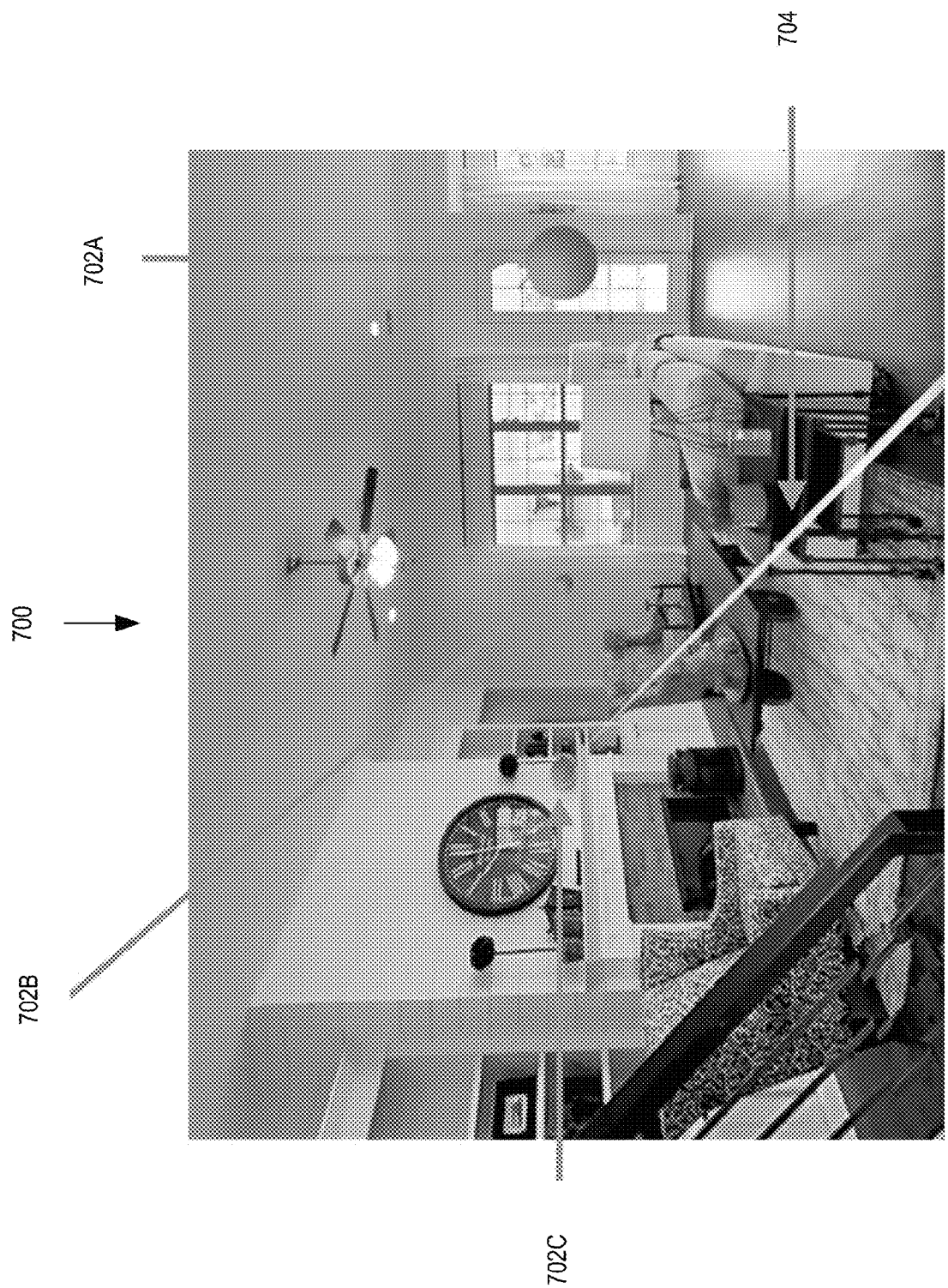
FIG. 7 show navigating through an example virtual reality (VR) environment using navigation-point markers.

FIG. 7 shows an example of navigating through a virtual reality (VR) environment 700 using navigation point markers and "ray casting." The VR environment 700 includes three navigation point markers 702A, 702B, and 702C. Each of the navigation-point markers 702A, 702B, and 702C appears as a sphere in the VR environment 700. A ray 704 is cast in three dimensions in the VR environment 700 from the position of a hand controller of a user. In this example, the user is selecting navigation-point marker 702C by using the hand controller to orient the ray 704 to intersect the navigation-point marker 702C in three dimensions. Once the navigation-point marker 702C is selected in this way, the user may then navigate in the VR environment 700 the location corresponding to navigation-point marker 702C by performing an additional "navigate" action such as tapping a button, uttering a command, or maintaining the ray 704 pointed at the marker 704C for more than a predetermined amount of time.

Different transitions in the virtual reality environment between viewing positions can appear to the user. For example, a "discrete" transition may visibly transition a user from a current viewing position to a selected viewing position by fading out the view at the current viewing position and fading in a view at the selected viewing position. As an alternative, a "continuous" transition may visibly transition a user by flying through the virtual reality environment from the current viewing position to the selected viewing position.

Techniques described herein may be used to select navigation points for navigating through a virtual reality environment like the example virtual environment shown in FIGS. 6A through 6E and the example virtual environment shown in FIG. 7.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 606 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 604 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
  using a processor to execute the following computer executable instructions stored in a memory to perform the following acts:
    obtaining a set of connected navigation points in a virtual environment;
    selecting a first subset of navigation points from the set of connected navigation points that provide a threshold amount of coverage of the virtual environment;
    identifying a second subset of navigation points included in the set of connected navigation points that are excluded from the first subset;
    selecting one or more navigation points included in the second subset for removal from the set of connected navigation points based on a determination that a reduced set of navigation points resulting from the removal of the one or more navigation points from the set of connected navigation points will be connected;

determining positions at which to display navigation-point-markers in the virtual environment based on the reduced set of navigation points; and displaying the navigation-point-markers at the positions in association with navigation of the virtual environment.

2. The method of claim 1, wherein the selecting the one or more navigation points for removal comprises:

determining navigation quality scores for respective navigation points included in the second subset; and selecting the one or more navigation points based on the navigation quality scores.

3. The method of claim 2, wherein the determining the navigation quality scores comprises computing the navigation quality scores based on numerical weights assigned to navigation point quality characteristics of the respective navigation.

4. The method of claim 3, wherein the numerical weights are learned according to a supervised machine learning process based on training data comprising navigation quality labels assigned to available navigation points based on historical dwell times of navigation visits to the available navigation points.

5. The method of claim 2, wherein the navigation point quality characteristics comprise at least one of:

net coverage in the virtual environment, proximity to a boundary of an object in the virtual environment, proximity to another navigation point in the virtual environment, and quality of photo images captured at a real-world image-capture positions that corresponds to the respective navigation points.

6. The method of claim 2, wherein the selecting the one or more navigation points for removal based on the navigation quality scores comprises evaluating whether to remove or keep the respective navigation points in an order from lowest navigation quality score to highest navigation quality score; and removing a navigation point of the respective navigation points in response to a determination to remove the navigation point prior to evaluating a subsequent navigation point with a higher navigation quality score.

7. The method of claim 1, wherein the virtual environment is based on a three-dimensional model constructed based on photo images of a real-world location, and wherein each navigation point in the set corresponds to an image-capture position in the real-world location at which one or more of the photo images was captured.

8. The method of claim 1, wherein the selecting the one or more navigation points for removal is based on quality of photo images captured at positions that correspond to respective navigation points included in the second subset of navigation points.

9. The method of claim 1, wherein the selecting the one or more navigation points for removal is based on an amount by which a total amount coverage of the virtual environment provided by the set of navigation points is reduced by removal of the one or more navigation points.

10. The method of claim 1, wherein the selecting the one or more navigation points for removal is based on proximity of the one or more navigation points to boundaries of objects in the virtual environment.

11. The method of claim 1, wherein the selecting the one or more navigation points for removal is based on proximity of the one or more navigation points to other navigation points in the set.

12. The method of claim 1, wherein selecting the first subset comprises selecting a combination of navigation points included in the set of navigation points that provides at least the threshold amount of coverage with the fewest number of navigation points.

13. The method of claim 1, wherein selecting the first subset comprises:

randomly selecting a first combination of N navigation points from the set of navigation points;

determining a first coverage of the first combination of N navigation points;

randomly selecting a second combination of N navigation points from the input set of navigation points;

determining a second coverage of the second combination of N navigation points; and selecting the second combination of N navigation points as the first subset based on a first determination that the second coverage is greater than the first coverage, and a second determination that the second coverage is greater than the threshold coverage.

14. A system comprising:

a processor; and a memory that stores executable instructions that, when executed by the processor, facilitate performance of operations, comprising:

identifying a first subset of navigation points included in a set of connected navigation points for a virtual environment that provide a threshold amount of coverage of the virtual environment;

classifying remaining navigation points included in the set of connected navigation points yet excluded from the first subset of navigation of navigation points as pruning candidate navigation points;

selecting one or more of the pruning candidate navigation points for removal from the set of navigation points based on a determination that a reduced set of navigation points resulting from the removal of the one or more pruning candidate navigation points from the set of connected navigation points will be connected; and determining a position at which to display a navigation-point-marker in the virtual environment based on the reduced set of navigation points.

15. The system of claim 14, wherein the operations further comprise:

displaying the navigation-point-marker at the positions in association with navigation of the virtual environment.

16. The system of claim 14, wherein the selecting further comprises:

scoring the pruning candidate navigation points with navigation quality scores based on scoring criteria reflective of a degree of navigation quality provided by respective pruning candidate navigation points of the pruning candidate navigation points; and selecting the one or more pruning candidate navigation points based on the navigation quality scores associated therewith.

17. The system of claim 16, wherein the scoring criteria comprises coverage in the virtual environment provided by the respective pruning candidate navigation points.

18. The system of claim 16, wherein the scoring criteria comprises proximity of the respective pruning candidate navigation points to a boundary of an object in the virtual environment.

19. The system of claim 16, wherein the scoring criteria comprises quality of photo images captured at a real-world image-capture positions that corresponds to the respective pruning candidate navigation points.

* * * * *